US012773749B2

(12) United States Patent
Izumi

(10) Patent No.: US 12,773,749 B2
(45) Date of Patent: Oct. 27, 2026

(54) LASER WELDING METHOD FOR WORKPIECE

(71) Applicant: Fanuc Corporation, Minamitsuru-gun (JP)

(72) Inventor: Takashi Izumi, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 739 days.

(21) Appl. No.: 18/032,233

(22) PCT Filed: Oct. 25, 2021

(86) PCT No.: PCT/JP2021/039364
§ 371 (c)(1),
(2) Date: Apr. 17, 2023

(87) PCT Pub. No.: WO2022/092042
PCT Pub. Date: May 5, 2022

(65) Prior Publication Data

US 2023/0390867 A1 Dec. 7, 2023

(30) Foreign Application Priority Data

Oct. 30, 2020 (JP) ................................ 2020-183152

(51) Int. Cl.
*B23K 26/21* (2014.01)
*B23K 26/064* (2014.01)
(Continued)

(52) U.S. Cl.
CPC .......... *B23K 26/21* (2015.10); *B23K 26/0643* (2013.01); *B23K 26/10* (2013.01); *B23K 26/53* (2015.10)

(58) Field of Classification Search
CPC .... B23K 26/21; B23K 26/322; B23K 26/082; B23K 26/08; B23K 26/244; B23K 26/53;
(Continued)

(56) References Cited

U.S. PATENT DOCUMENTS 10,155,285 B2 12/2018 Fujiwara et al.
2009/0305469 A1 * 12/2009 Kato ...................... H10D 86/01 257/E21.409
2019/0160599 A1 * 5/2019 Izumi ................. B23K 26/0643

FOREIGN PATENT DOCUMENTS

JP 62296982 A 12/1987
JP H03-234387 A 10/1991
(Continued)

OTHER PUBLICATIONS

International Search Report and Written Opinion for International Application No. PCT/JP2021/039364, dated Dec. 14, 2021, 6 pages.

*Primary Examiner* — Nathaniel E Wiehe
*Assistant Examiner* — Maxime M Adjagbe
(74) *Attorney, Agent, or Firm* — BUCHANAN INGERSOLL & ROONEY PC

(57) ABSTRACT

In a method for laser welding of workpieces W1 and W2, a laser beam is generated and a workpiece W1 is irradiated. An irradiation point of the laser beam is swung within a predetermined heating area on the workpiece W1 encompassing a welding location where laser welding is to be executed, heating the mating surface area of the workpieces W1 and W2 corresponding to the heating area to a temperature higher than or equal to the boiling point of the coating material of the workpiece W2 and lower than the melting point of the base material of the workpiece W1, forming a gap between the workpieces W1 and W2 by vaporizing the coating material by the heating, discharging the coating material through the gap to the outside of the mating surface
(Continued)

area, and melting and welding together the welding location of the base materials of the workpieces W1 and W2.

14 Claims, 20 Drawing Sheets

(51) Int. Cl.
*B23K 26/10* (2006.01)
*B23K 26/53* (2014.01)

(58) Field of Classification Search
CPC .. B23K 26/034; B23K 26/10; B23K 26/0643; B23K 2101/34
See application file for complete search history.

(56) References Cited

FOREIGN PATENT DOCUMENTS

| | | | |
|---|---|---|---|
| JP | H04-138888 | A | 5/1992 |
| JP | 2003025082 | A | 1/2003 |
| JP | 2009-050894 | A | 3/2009 |
| JP | 2010094701 | A | 4/2010 |
| JP | 2015-074012 | A | 4/2015 |
| WO | 2015104781 | A1 | 7/2015 |

* cited by examiner

LASER WELDING METHOD FOR WORKPIECE

CROSS REFERENCE TO RELATED APPLICATIONS

This is the U.S. National Phase application of PCT/JP2021/039364, filed Oct. 25, 2021, which claims priority to Japanese Patent Application No. 2020-183152, filed Oct. 30, 2020, the disclosures of these applications being incorporated herein by reference in their entireties for all purposes.

FIELD OF THE INVENTION

The present disclosure relates to a method of laser welding workpieces.

BACKGROUND OF THE INVENTION

There has been known a method of laser welding a pair of workpieces (galvanized steel sheets) stacked with a cover material (galvanized) interposed therebetween (e.g., Patent Literature 1).

PATENT LITERATURE

Patent Literature 1: WO 2015/104781

SUMMARY OF THE INVENTION

There has been known a problem in that when the cover material interposed between base materials is vaporized by heat of the laser beam to be mixed in the base materials molten, bubbles are formed inside the base materials.

A method of laser welding a first workpiece and a second workpiece stacked so as to surface-contact with each other, the first workpiece and the second workpiece each including a base material, at least one of the first workpiece and the second workpiece including a cover material interposed between the base materials of the first workpiece and the second workpiece, of one aspect of the present disclosure includes: generating a laser beam by a laser oscillator and irradiating the first workpiece with the laser beam; swinging an irradiation point of the laser beam within a heating area, which is set on the first workpiece so as to encompass a welding location on which the laser welding is to be executed, and heating a mating surface area of the first workpiece and the second workpiece, which corresponds to a heating area, to a temperature being equal to or higher than a boiling point of the cover material and lower than a melting point of the base material of the first workpiece; forming a gap between the first workpiece and the second workpiece by vaporizing the cover material in the mating surface area by the heating, and discharging the cover material to outside of the mating surface area through the gap; and melting and welding the base materials of the first workpiece and the second workpiece to each other in the welding location by irradiating the welding location with the laser beam, after discharging the cover material to the outside of the mating surface area.

With the present disclosure, the cover material can be discharged from the mating surface area through the gap. Thus, the cover material can be reliably removed from the region where the base materials melt. Thus, when the base materials are molten in the welding location, vapor of the cover material can be prevented from mixing into the base materials in a form of bubbles. No through hole for discharging the vapor of the cover material to the outside needs to be formed in the base materials, whereby processes of the welding flow can be simplified.

DETAILED DESCRIPTION OF EMBODIMENTS OF THE INVENTION

Figure 1:
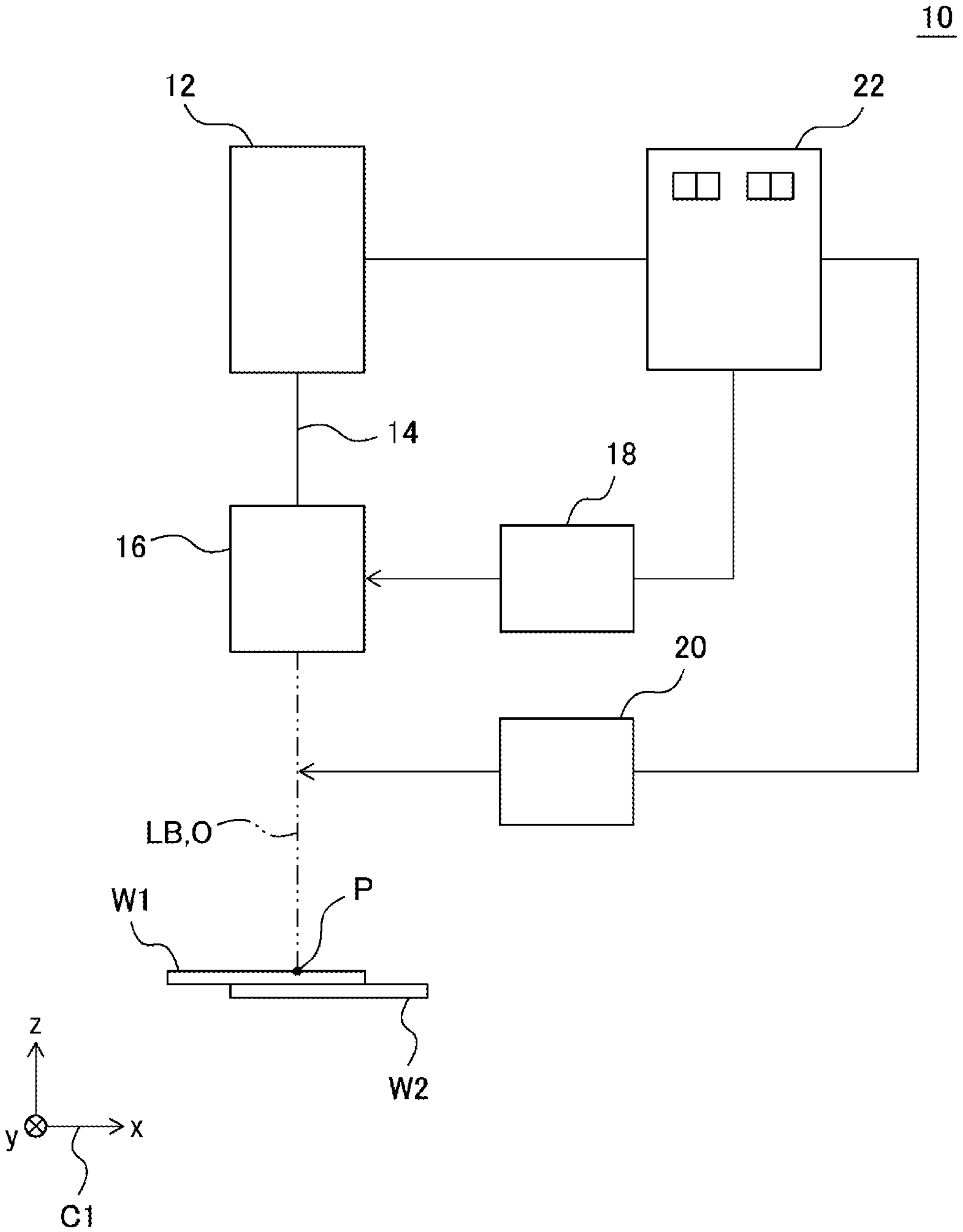
FIG. 1 is a schematic view of a laser welding system according to an embodiment.

Hereinafter, embodiments of the present disclosure will be described in detail with reference to the drawings. In various embodiments described below, the same elements are designated by the same reference numerals and duplicate description will be omitted. In the following description, an orthogonal coordinate system C1 in each drawing is used as a reference for directions, and for the sake of convenience, a positive x-axis direction of the coordinate system C1 is referred to as toward the right side, a positive y-axis direction is referred to as toward the front, and a positive z-axis direction is referred to as toward the upper side.

Figure 2:
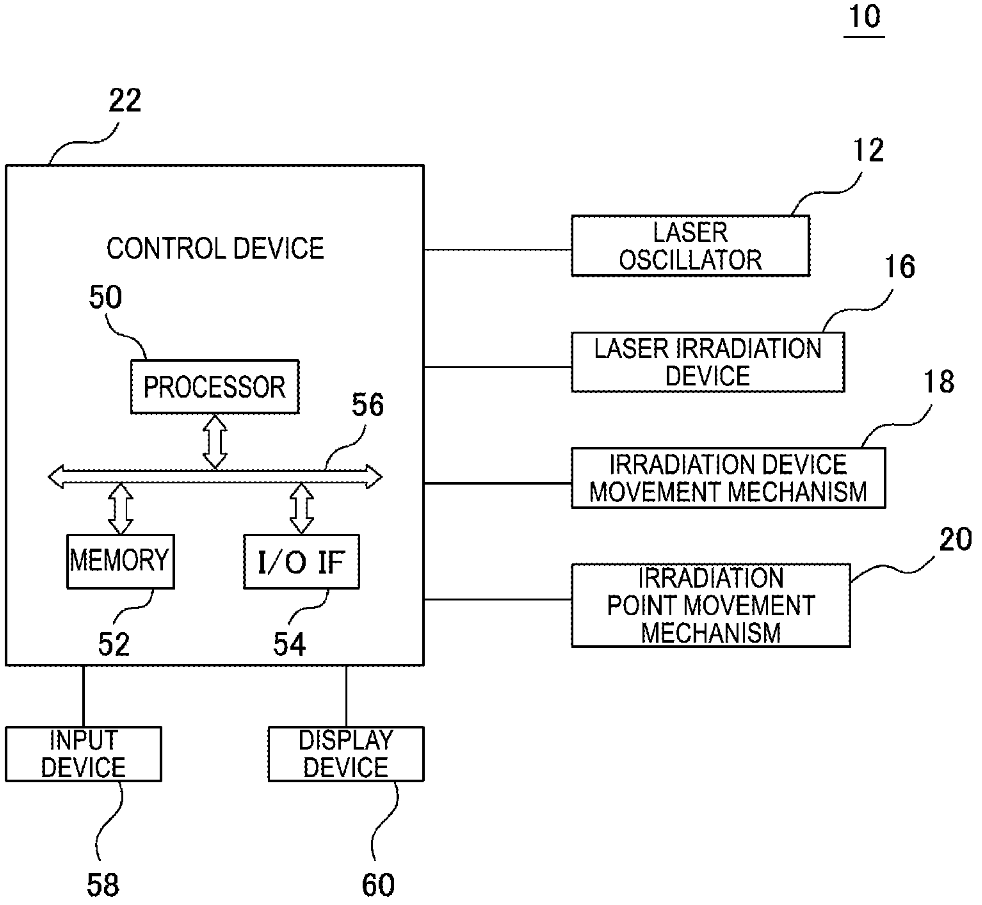
FIG. 2 is a block diagram of the laser welding system illustrated in FIG. 1.

A laser welding system 10 according to an embodiment is described with reference to FIG. 1 and FIG. 2. The laser welding system 10 is a system for welding a pair of workpieces W1 and W2 using a laser beam. The laser welding system 10 includes a laser oscillator 12, a light-guiding member 14, a laser irradiation device 16, an irradiation device movement mechanism 18, an irradiation point movement mechanism 20, and a control device 22.

The laser oscillator 12 is a solid-state laser oscillator (e.g., a YAG laser oscillator or a fiber laser oscillator) or a gas laser oscillator (e.g., a carbon dioxide laser oscillator), or the like, internally generates a laser beam LB through optical resonance in response to a command from the control device 22, and emits the laser beam LB to the light-guiding member 14.

The light-guiding member 14 includes an optical element such as an optical fiber, a light guide path made of a hollow or light-transmitting material, a reflection mirror, or an optical lens, and guides the laser beam LB generated by the laser oscillator 12 to the laser irradiation device 16. The laser irradiation device 16 is a laser scanner, a laser processing head, or the like, focuses the laser beam LB incident from the light-guiding member 14, and irradiates the workpiece W1 with the laser beam LB.

The irradiation device movement mechanism 18 moves the laser irradiation device 16 relative to the workpiece W1 and the workpiece W2. For example, the irradiation device movement mechanism 18 is a vertical articulated robot capable of moving the laser irradiation device 16 to any position in the coordinate system C1. Alternatively, the irradiation device movement mechanism 18 may include a plurality of ball screw mechanisms that move the laser irradiation device 16 along the x-y plane of the coordinate system C1 and in the z-axis direction of the coordinate system C1.

The coordinate system C1 is, for example, a world coordinate system defining a three-dimensional space of a work cell, a movement mechanism coordinate system (e.g., a robot coordinate system) for controlling the operation of the irradiation device movement mechanism 18, a workpiece coordinate system defining the coordinates of the workpiece W1 and the workpiece W2, or the like, and is a control coordinate system for automatically controlling the operation of movable components (i.e., the irradiation device movement mechanism 18 and the irradiation point movement mechanism 20) of the laser welding system 10.

The irradiation point movement mechanism 20 moves an irradiation point P on the workpiece W1, when the laser irradiation device 16 irradiates the workpiece W1 with the laser beam LB, relative to the workpiece W1. Specifically, the irradiation point movement mechanism 20 includes an optical element such as a mirror or an optical lens, a driving device for driving the optical element, a work table for moving the workpiece W1 and the workpiece W2, and the like, and operates these components, to move the irradiation point P relative to the workpiece W1.

The control device 22 controls the operation of the laser oscillator 12, the laser irradiation device 16, the irradiation device movement mechanism 18, and the irradiation point movement mechanism 20. Specifically, the control device 22 is a computer including a processor 50, a memory 52, and an I/O interface 54. The processor 50 includes a CPU, a GPU, or the like, and is communicably connected to the memory 52 and the I/O interface 54 via a bus 56. The processor 50 performs arithmetic processing for implementing various functions described below while communicating with the memory 52 and the I/O interface 54.

The memory 52 includes a RAM, a ROM, or the like, and stores various types of data temporarily or permanently. The I/O interface 54 includes, for example, an Ethernet (trade name) port, a USB port, an optical fiber connector, or an HDMI (trade name) terminal and performs wired or wireless data communications with an external device under a command from the processor 50.

The control device 22 is provided with an input device 58 and a display device 60. The input device 58 includes a keyboard, a mouse, a touch panel, or the like, and accepts input of data from an operator. The display device 60 includes a liquid crystal display, an organic EL display, or the like and displays various types of data. The laser oscillator 12, the laser irradiation device 16, the irradiation device movement mechanism 18, the irradiation point movement mechanism 20, the input device 58, and the display device 60 are connected to the I/O interface 54, in such a manner as to be capable of performing wired or wireless communications.

Figure 3:
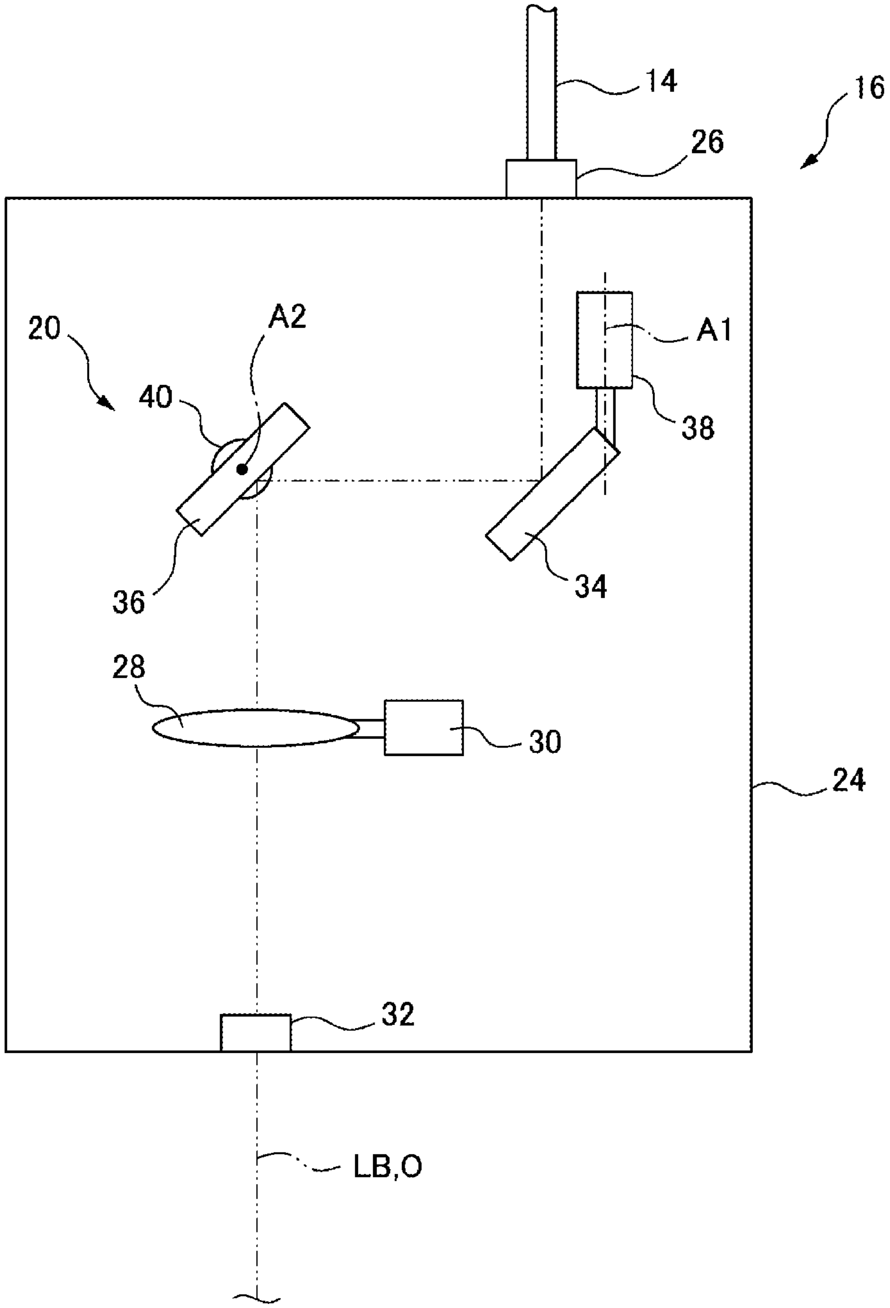
FIG. 3 is an example of a laser irradiation device and an irradiation point movement mechanism illustrated in FIG. 1.

Next, the laser irradiation device 16 and the irradiation point movement mechanism 20 according to an embodiment will be described with reference to FIG. 3. The laser irradiation device 16 illustrated in FIG. 3 is a laser scanner including a main body 24, a light receiver 26, an optical lens 28, a lens driving device 30, and an emitting unit 32. The main body 24 is hollow, and has a propagation path for the laser beam LB defined therein. The light receiver 26 is provided to the main body 24 and receives the laser beam LB propagated in the light-guiding member 14.

The optical lens 28 has a focus lens and the like, and focuses the laser beam LB. In the present embodiment, the optical lens 28 is supported inside the main body 24 so as to be movable in the direction of an optical axis O of the laser beam LB incident on the optical lens 28. The lens driving device 30 includes a piezoelectric element, an ultrasonic vibrator, an ultrasonic motor, or the like, and displaces the optical lens 28 in the direction of the optical axis O in response to a command from the control device 22, and thus displaces the focal point of the laser beam LB, with which the workpiece W1 is irradiated, in the direction of the optical axis O. The emitting unit 32 emits the laser beam LB, focused by the optical lens 28, to the outside of the main body 24.

The main body 24 further accommodates mirrors 34 and 36 and mirror driving devices 38 and therein. The mirror 34 (first mirror) is supported inside the main body 24 so as to be rotatable about an axis A1. The mirror 34 is disposed on an optical path O of the laser beam LB entered into the main body 24 through the light receiver 26, and reflects the laser beam LB toward the mirror 36.

The mirror driving device 38 is a servo motor for example, and rotates the mirror 34 about the axis A1 in response to a command from the control device 22. By thus rotating the mirror 34, the mirror driving device 38 changes the orientation of the mirror 34, and thus can change the direction of reflection of the laser beam LB by the mirror 34.

The mirror 36 (second mirror) is supported inside the main body 24 so as to be rotatable about an axis A2. The axis A2 and the axis A1 are substantially orthogonal to each other. The mirror 36 is disposed on the optical path O of the laser beam LB reflected by the mirror 34, and reflects the laser beam LB toward the optical lens 28.

The mirror driving device 40 is a servo motor for example, and rotates the mirror 36 about the axis A2 in response to a command from the control device 22. By thus rotating the mirror 36, the mirror driving device 40 changes the orientation of the mirror 36, and thus can change the direction of reflection of the laser beam LB by the mirror 36. Generally, the mirrors 34 and 36 are what are known as galvano mirrors, and the mirror driving devices 38 and 40 are what are known as galvano motors.

As described above, the laser beam LB that has entered into the main body 24 from the light receiver 26 is reflected by the mirrors 34 and 36, and then is focused by the optical lens 28. The resultant laser beam LB is to emitted to the outside through the emitting unit 32 and onto the workpiece W1. The control device 22 operates the mirror driving devices 38 and 40, to change the orientation of each of the mirrors 34 and 36, and thus moves the irradiation point P on the workpiece W1 irradiated with the laser beam LB, relative to the workpiece W1. Thus, in the present embodiment, the mirrors 34 and 36, and the mirror driving devices 38 and 40 form the irradiation point movement mechanism 20.

Figure 4:
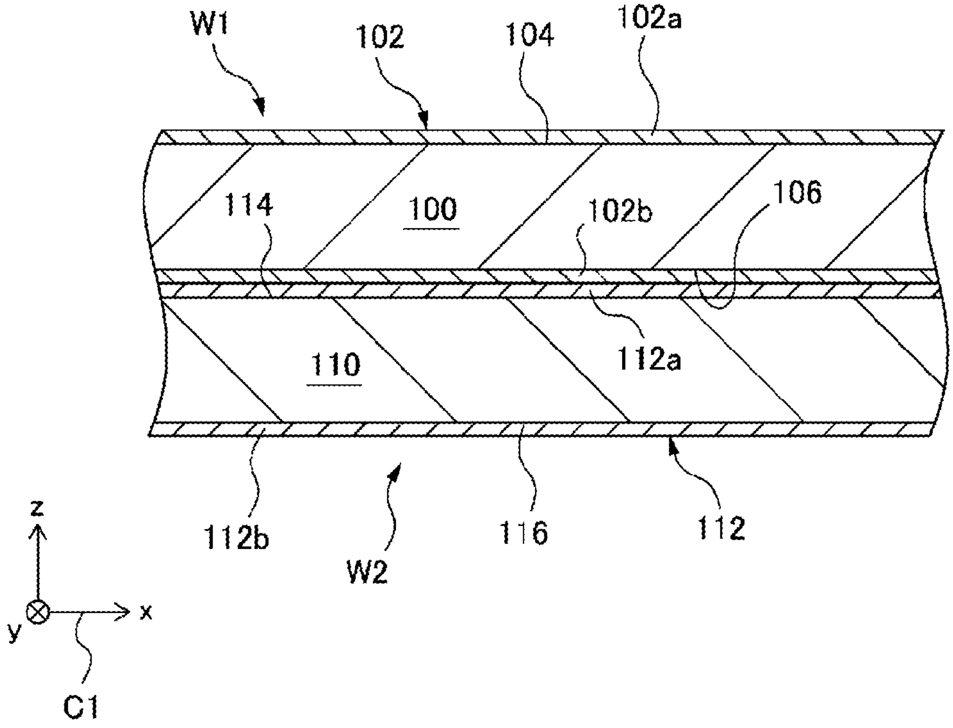
FIG. 4 is an enlarged cross-sectional view of a pair of workpieces illustrated in FIG. 1.

Next, a method of laser welding the workpiece W1 and the workpiece W2 by using the laser welding system 10 will be described. As illustrated in FIG. 1 and FIG. 4, the workpiece W1 and the workpiece W2 are flat-plate members, are stacked so as to surface-contact with each other, and are fixed by a jig (not illustrated) or the like. In the present embodiment, each of the workpieces W1 and W2 is positioned at a known position in the coordinate system C1 so as to be substantially parallel to the x-y plane of the coordinate system C1.

The workpiece W1 includes a base material 100 and a cover material 102 stacked on a surface of the base material 100. The base material 100 is a flat-plate member made of metal (e.g., iron), and includes an upper surface 104 and a lower surface 106 on the side opposite to the upper surface 104. In the present embodiment, the cover material 102 is stacked on the surfaces of the base material 100 so as to cover the entire surfaces thereof, and includes a first layer 102*a* that covers the upper surface 104 of the base material 100 and a second layer 102*b* that covers the lower surface 106 of the base material 100. The cover material 102 is made of metal (e.g., zinc) of a type different from the base material 100.

Similarly, the workpiece W2 includes a base material 110 and a cover material 112 stacked on a surface of the base material 110. The base material 110 is a flat-plate member made of metal (e.g., iron), and includes an upper surface 114 and a lower surface 116 on the side opposite to the upper surface 114. In the present embodiment, the cover material 112 is stacked on the surfaces of the base material 110 so as to cover the entire surfaces thereof, and includes a first layer 112*a* that covers the upper surface 114 of the base material 110 and a second layer 112*b* that covers the lower surface 116 of the base material 110. The cover material 112 is made of metal (e.g., zinc) of a type different from the base material 110.

In the present embodiment, it is assumed that the base material 100 and the base material 110 are made of metal (iron) of the same type, and the cover material 102 and the cover material 112 are made of metal (zinc) of the same type (e.g., the workpiece W1 and the workpiece W2 are both galvanized steel sheets). A boiling point T1 of the cover material 102 and the cover material 112 (about 900° C. in the case of zinc) is lower than a melting point T2 of the base material 100 and the base material 110 (about 1500° C. in the case of iron).

The workpiece W1 and the workpiece W2 are stacked on and fixed such that the second layer 102*b* of the cover material 102 and the first layer 112*a* of the cover material 112 surface-contact with each other. As illustrated in FIG. 4, when the workpiece W1 and the workpiece W2 are fixed, the second layer 102*b* of the cover material 102 and the first layer 112*a* of the cover material 112 are interposed between the base material 100 and the base material 110.

As a preparation process PP for welding the workpiece W1 and the workpiece W2, the operator sets a work condition CD for executing the work of welding the workpiece W1 and the workpiece W2. The work condition CD includes: data on a welding location WL where the laser welding is to be executed in a full welding process WP described below; and data on a heating area HA where the workpiece W1 is to be heated in a heating process HP described below. Referring to FIG. 5 to FIG. 9, a method of setting the welding location WL and the heating area HA will be described below.

First of all, the operator sets the welding location WL for the workpiece W1 in the coordinate system C1. In the example illustrated in FIG. 5, the welding location WL is defined by two teaching points TP1 and TP2 set in the first layer 102*a* of the cover material 102 of the workpiece W1, and a welding line LN connecting the teaching points TP1 and TP2. The teaching points TP1 and TP2 are target positions in which the irradiation point P of the laser beam LB is to be positioned in the full welding process WP described below, and the welding line LN defines a target path in which the irradiation point P is to be moved from the teaching point TP1 to the teaching point TP2.

For example, the operator operates the input device 58 while visually recognizing drawing data (CAD data) of the workpiece W1 and the workpiece W2 displayed on the display device 60, and designates the teaching points TP1 and TP2 in the first layer 102*a* of the workpiece W1. The processor 50 sets the teaching points TP1 and TP2 and the welding line LN in the coordinate system C1 based on the input data from the operator.

Next, the operator operates the input device 58 to set the heating area HA so as to encompass the welding location WL on the first layer 102*a*. In the example illustrated in FIG. 5, the heating area HA is set as a rectangular region that includes the entire welding location WL on the inner side, has a longitudinal direction extending in parallel with the x axis of the coordinate system C1, and has a shorter side direction extending in parallel with the y axis of the coordinate system C1.

More specifically, the heating area HA has a length $x_1$ in the longitudinal direction, and has a width $y_1$ in the shorter side direction. As an example, the length $x_1$ of the heating area HA may be set in such a manner that a left side SD1 of the heating area HA is at a position separated toward the left side from the teaching point TP1 by a distance $x_2$ (e.g., by 1 [mm] to 2 [mm]), and a right side SD2 of the heating area HA is at a position separated toward the right side from the teaching point TP2 by a distance $x_3$ (e.g., 1 [mm] to 2 [mm]). Thus, in this case, the length $x_1$ of the heating area HA is longer than the length of the welding line LN in the x-axis direction of the coordinate system C1.

Also, the width $y_1$ of the heating area HA may be set to be at least three times as long as a width of a bead, formed on the welding line LN when the base material 100 and the base material 110 are welded along the welding line LN in the full welding process WP described below, in the y-axis direction of the coordinate system C1 (or the width of the irradiation point P of the laser beam LB in the full welding process WP or the heating process HP). Each vertex and side of the heating area HA can be expressed by coordinates on the coordinate system C1. Thus, the heating area HA is set in the first layer 102*a* so as to encompass the welding location WL.

Figure 6:
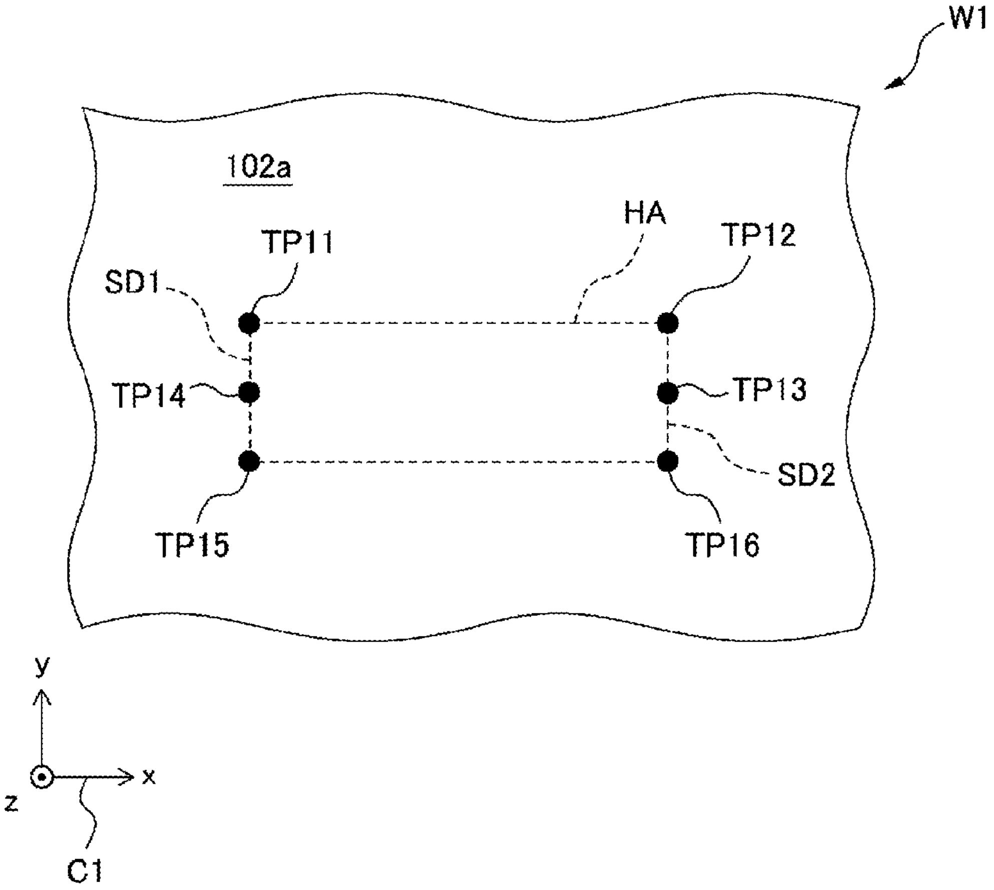
FIG. 6 illustrates an example of teaching points set in the heating area.

Next, the operator sets a teaching point TPn for the heating process HP and an irradiation point movement path MP in the heating area HA. The teaching point TPn for the heating process HP is a target position where the irradiation point P of the laser beam LB is to be positioned in the heating process HP described below. The irradiation point movement path MP defines a target path of the intended movement of the irradiation point P from the teaching point TPn to a teaching point TPn+1. FIG. 6 illustrates an example of how the teaching point TPn is set.

The operator operates the input device 58 to set teaching points TP11, TP12, TP13, TP14, TP15, and TP16 in the heating area HA. Note that in FIG. 6, the welding location WL is omitted for ease of understanding. In the example illustrated in FIG. 6, the teaching points TP11, TP12, TP15, and TP16 are disposed at the respective vertices of the heating area HA, and the teaching points TP14 and TP13 are disposed at midpoints of the respective sides SD1 and SD2 of the heating area HA.

Figure 7:
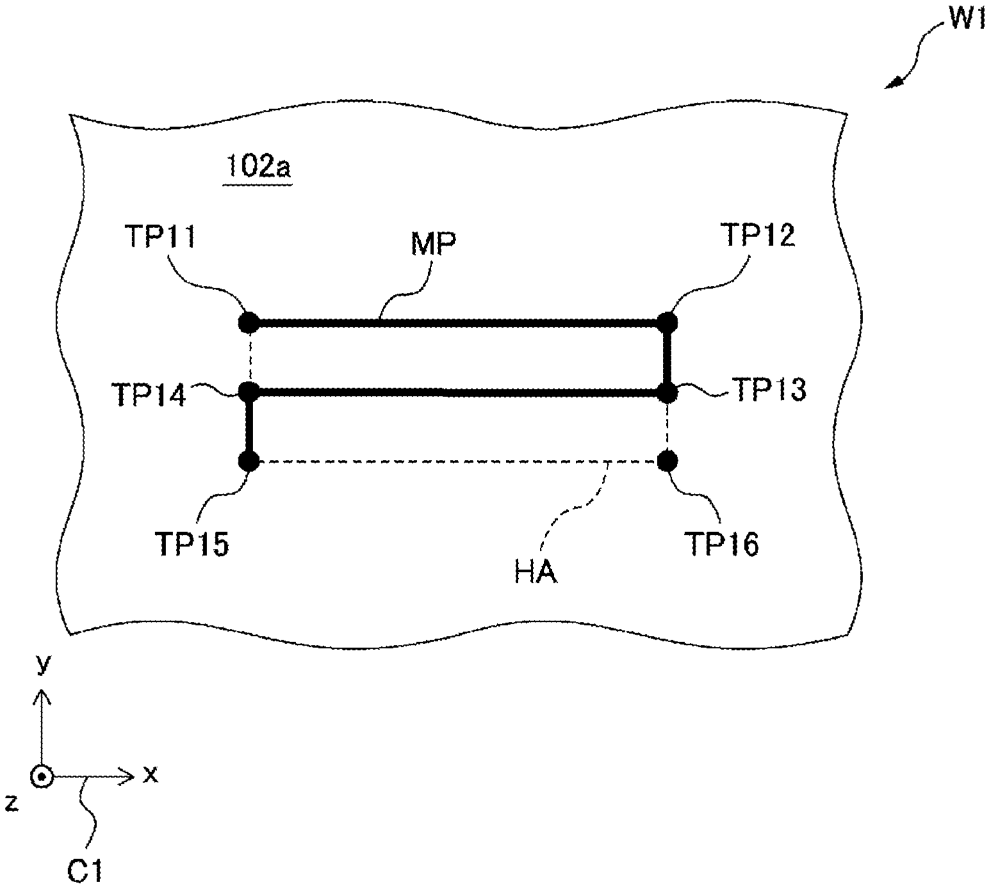
FIG. 7 illustrates an example of a forward path of an irradiation point movement path set to the heating area.

Next, the operator operates the input device 58 to set the forward path of the irradiation point movement path MP based on the teaching point TPn, as illustrated in FIG. 7. In the example illustrated in FIG. 7, the forward path of the irradiation point movement path MP is set as a path passing through the teaching points TP11, TP12, TP13, TP14, and TP15 in this order.

Figure 8:
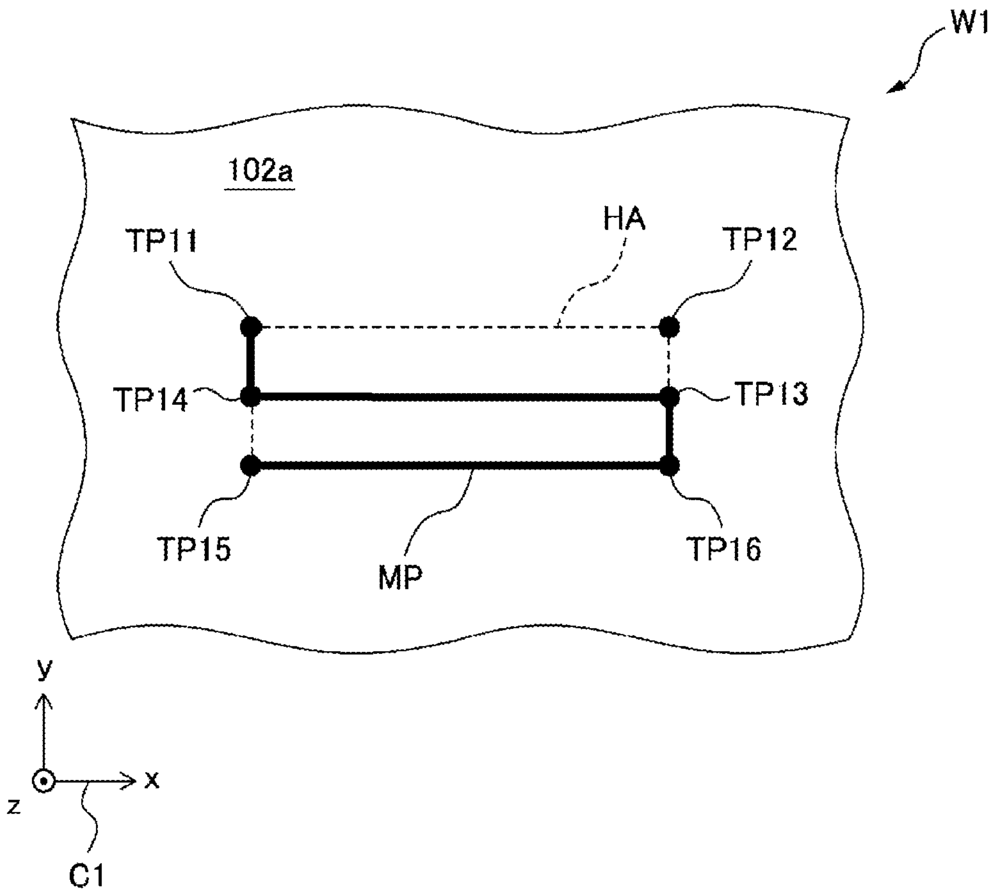
FIG. 8 illustrates an example of a return path of the irradiation point movement path set to the heating area.
Figure 9:
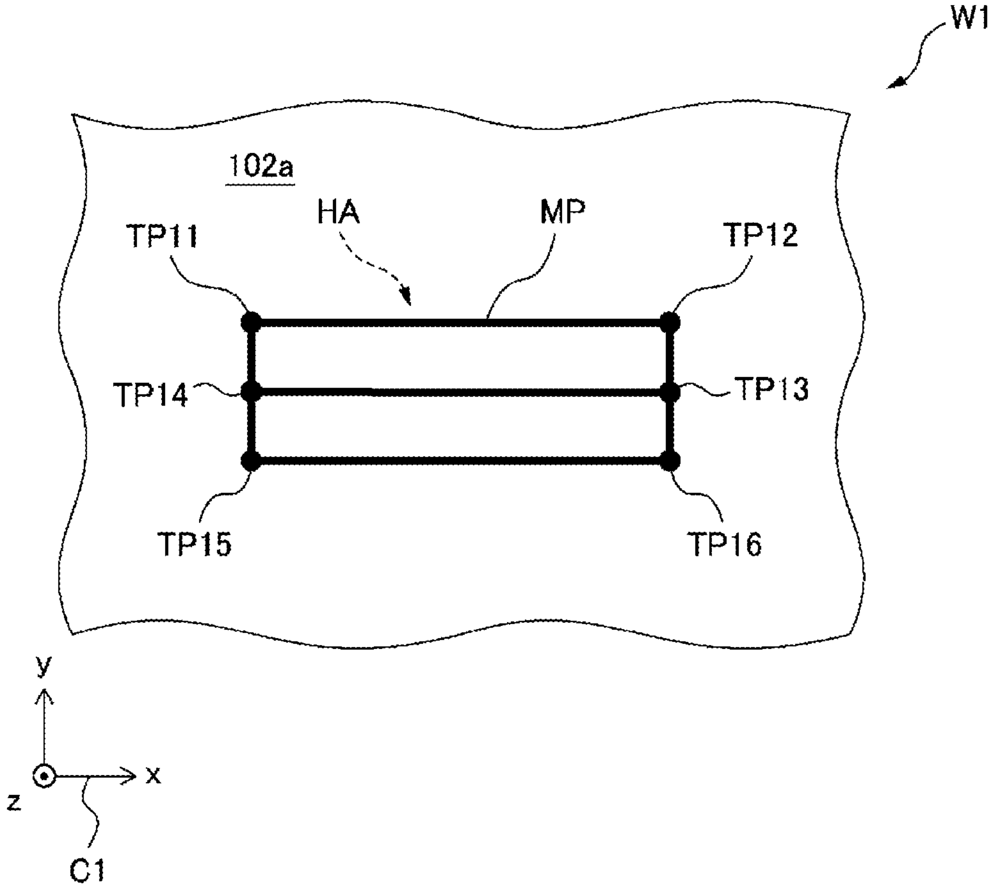
FIG. 9 illustrates an example of the irradiation point movement path set to the heating area.

Next, the operator operates the input device 58 to set the return path of the irradiation point movement path MP, as illustrated in FIG. 8. In the example illustrated in FIG. 8, the return path of the irradiation point movement path MP is set as a path passing through the teaching points TP15, TP16, TP13, TP14, and TP11 in this order. Thus, as illustrated in FIG. 9, the irradiation point movement path MP is set in the heating area HA, as a path that passes through the teaching points TP11, TP12, TP13, TP14, TP15, TP16, TP13, TP14, and TP11 in this order.

The teaching points TP11 to TP16 and the irradiation point movement path MP are expressed with coordinates in the coordinate system C1. The position of the heating area HA in the coordinate system C1 can be expressed with coordinates of the teaching points TP11 to TP16 and the irradiation point movement path MP. Thus, the heating area HA can be regarded as the region defined by the teaching points TP11 to TP16 and the irradiation point movement path MP.

As described above, the operator sets the welding location WL (the teaching points TP1 and TP2 and the welding line LN) and the heating area HA (the teaching points TP11 to TP16, and the irradiation point movement path MP) for the workpiece W1. The operator may set a plurality of the welding locations WL and heating areas HA at different positions on the workpiece W1.

The position data (specifically, the coordinates of the teaching points TP1 and TP2 and the welding line LN in the coordinate system C1) on the welding location WL, and the position data (specifically, the coordinates of the teaching points TP11 to TP16 and the irradiation point movement path MP in the coordinate system C1) of the heating area HA thus set are stored in the memory 52 as the work condition CD.

The work condition CD further includes data such as: swinging speed V1 (first speed) of the irradiation point P and laser power LP1 of the laser beam LB in the heating process HP; a time period tip during which the heating process HP is executed; forward movement speed V2 (second speed) of the irradiation point P and laser power LP2 of the laser beam LB in the full welding process WP; a focal position FP of the laser beam LB in the heating process HP and the full welding process WP; and an operation mode OM of the laser oscillator 12 in the heating process HP and the full welding process WP.

For example, the operation mode OM of the laser oscillator 12 includes a first operation mode OM1 under which the laser oscillator 12 generates a laser beam LB1 of a first type, and a second operation mode OM2 under which the laser oscillator 12 generates a laser beam LB2 of a second type different from the first type. For example, the laser beam LB1 of the first type is a pulsed oscillation laser beam, whereas the laser beam LB2 of the second type is a continuous wave laser beam.

In the preparation process PP, the operator operates the input device 58 to set the work condition CD including the speed V1 and the speed V2, the laser power LP1 and the laser power LP2, the time period tip, the coordinates of the focal position FP in the coordinate system C1, and the operation mode OM. Then, the operator generates a welding program PG based on the set work condition CD (the welding location WL, the heating area HA, the speed V1 and the speed V2, the laser power LP1 and the laser power LP2, the time period tip, the focal position FP, and the operation mode OM).

Figure 10:
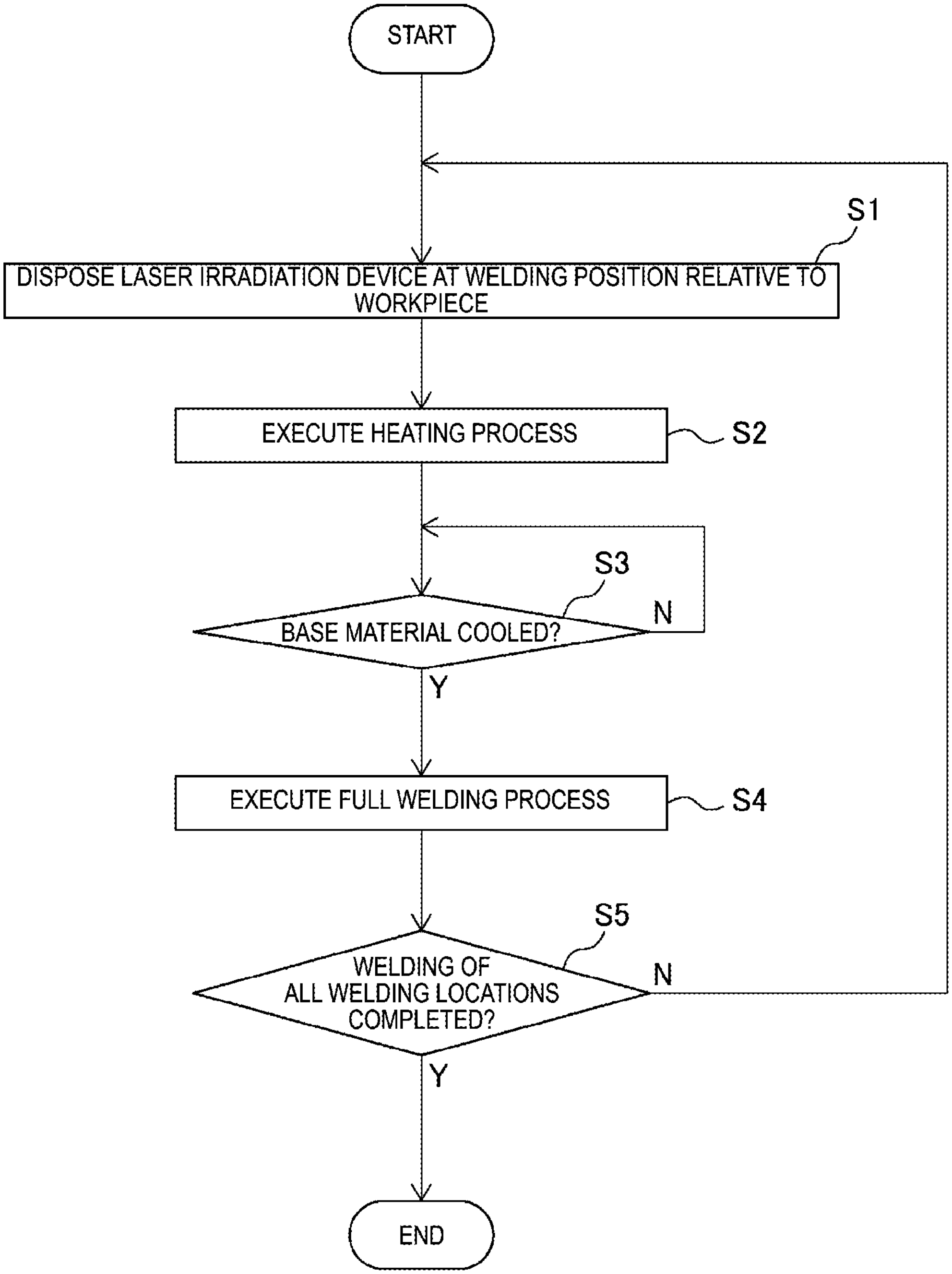
FIG. 10 is a flowchart illustrating an example of a welding flow performed by the laser welding system.

The welding program PG is a computer program that makes the processor 50 execute a welding flow described below (FIG. 10). Parameters of the work condition CD are defined in the welding program PG. The welding program PG generated is stored in the memory 52 of the control device 22. Thus, in the preparation process PP, the work condition CD is set and the welding program PG is generated.

Next, the welding flow executed by the laser welding system 10 will be described with reference to FIG. 10. The welding flow illustrated in FIG. 10 starts when the processor 50 receives a welding start command from the operator, a higher-level controller, or a computer program (e.g., the welding program PG). The processor 50 executes the welding flow illustrated in FIG. 10 according to the welding program PG that is stored in the memory 52 in advance.

In step S1, the processor 50 operates the irradiation device movement mechanism 18 to place the laser irradiation device 16 at a predetermined welding position Pw relative to the workpiece W1 and the workpiece W2. When the laser irradiation device 16 is placed at this welding position Pw, the entirety of the heating area HA set for one welding location WL to be welded falls within the range of movement of the irradiation point P, on the workpiece W1, caused by the irradiation point movement mechanism 20.

In step S2, the processor 50 executes the heating process HP. Specifically, the processor 50 first switches the operation mode OM of the laser oscillator 12 to the first operation mode OM1, and transmits a command for generating the laser beam LB1 of the first type having the laser power LP1, to the laser oscillator 12. In response to the command, the laser oscillator 12 generates the laser beam LB1 having the laser power LP1 through pulsed oscillation, and emits the laser beam LB1 to the laser irradiation device 16 through the light-guiding member 14.

In addition, the processor 50 operates the lens driving device 30 (FIG. 3) of the laser irradiation device 16 to adjust the position of the optical lens 28, to control the focal point of the laser beam LB1 emitted from the laser irradiation device 16 to be at a focal position FP1. In the present embodiment, the focal position FP1 is set to a position shifted slightly toward the upper side (or lower side) from the upper surface of the workpiece W1 (i.e., the upper surface of the first layer 102*a* of the cover material 102).

Thus, the laser beam LB1 having the laser power LP1 is emitted onto the workpiece W1. An irradiation point P1 of the laser beam LB1 at this time has an area E1. The area E1 is proportional to the shifted amount of the focal position FP1 from the upper surface of the workpiece W1. Note that at this time point, the irradiation point P1 may be disposed at the teaching point TP11 of the heating area HA.

Next, the processor 50 operates the irradiation point movement mechanism 20 to swing the irradiation point P1 of the laser beam LB1 at the speed V1 in the heating area HA. Specifically, the processor 50 operates the mirror driving devices 38 and 40 to respectively change the orientation of the mirrors 34 and 36, and thus makes the irradiation point P1 move at the speed V1 relative to the workpiece W1.

For example, when the laser irradiation device 16 is placed at the welding position Pw, the irradiation point P1 can be displaced along the x axis of the coordinate system C1 in the heating area HA by changing the orientation of one of the mirrors 34 and 36, and the irradiation point P1 can be displaced along the y axis of the coordinate system C1 in the heating area HA by changing the orientation of the other one of the mirrors 34 and 36.

The processor 50 changes the orientation of each of the mirrors 34 and 36, to make the irradiation point P1 repeatedly reciprocate at the speed V1 along the irradiation point movement path MP described above (path passing through the teaching points TP11, TP12, TP13, TP14, TP15, TP16, TP13, TP14, and TP11 in this order), to thus make the irradiation point P1 swing in the heating area HA. This speed V1 is set to 200 [m/min], for example.

With the irradiation point P1 thus swinging at high speed in the heating area HA, the heating area HA is entirely heated by the laser beam LB1. The heat produced in the heating area HA propagates to a mating surface area SE between the workpiece W1 and the workpiece W2 through the base material 100. Thus, the mating surface area SE is also heated.

The mating surface area SE may be defined as a region including the lower surface of the second layer 102*b* and the upper surface of the first layer 112*a* respectively of the cover material 102 and the cover material 112 in surface contact with each other, and a region between the lower surface 106 of the base material 100 and the upper surface 114 of the base material 110 (or the occupied region of the second layer 102*b* and the first layer 112*a*) for example.

In the present embodiment, the processor 50 makes the irradiation point P1 continuously swing for the time period tip in the heating area HA, to heat a mating surface area SE' corresponding to the heating area HA in the mating surface area SE, to a temperature T that is equal to or higher than a boiling point T1 of the cover material 102 (i.e., the cover material 112) and lower than the melting point T2 of the base material 100 (i.e., the base material 110) (T1≤T<T2).

Figure 11:
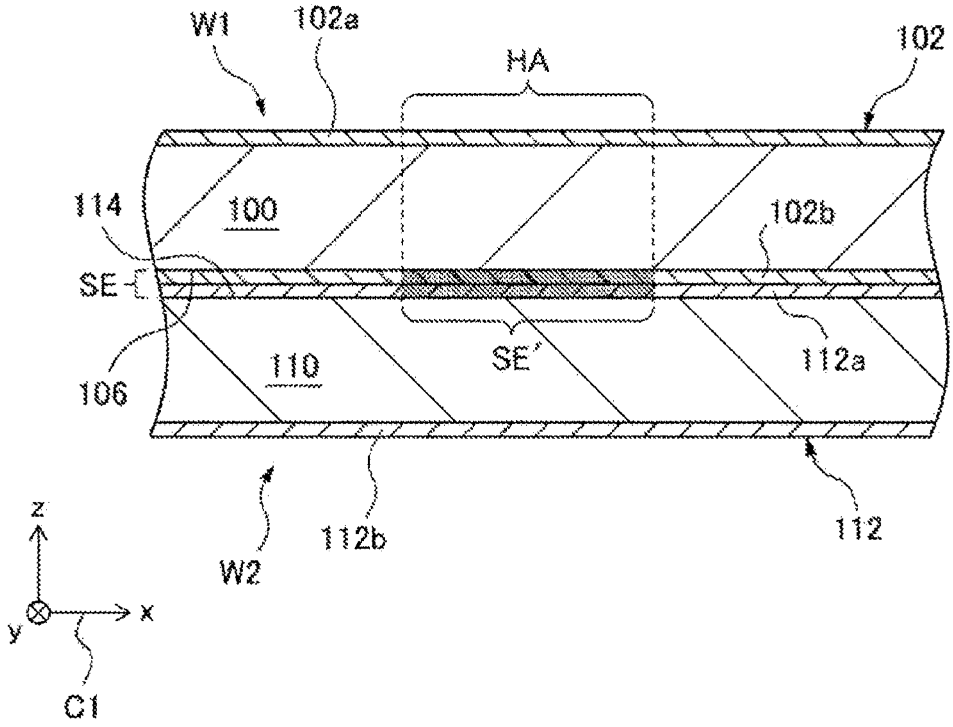
FIG. 11 is a diagram, corresponding to FIG. 4, illustrating a mating surface area.

For example, the mating surface area SE' may be defined as a region of the heating area HA projected onto the mating surface area SE in the z-axis direction of the coordinate system C1 (in other words, a region, of the mating surface area SE, having the position in the x-y plane of the coordinate system C1 and the area that are substantially the same as those of the heating area HA). In FIG. 11, an example of the mating surface area SE' is schematically illustrated as a gray region.

Figure 12:
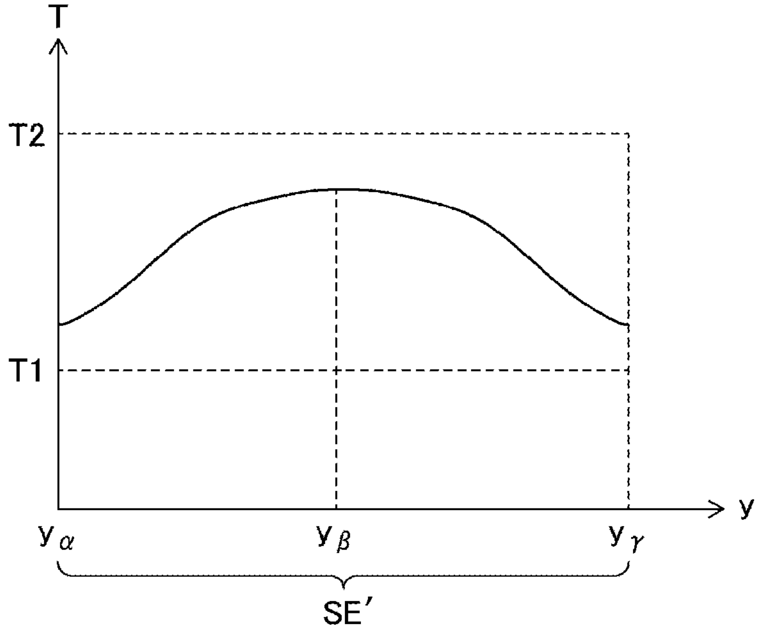
FIG. 12 illustrates an example of a graph of a temperature distribution of the mating surface area.

FIG. 12 illustrates an example of a graph of a temperature distribution of the mating surface area SE' heated in this step S2, in the y-axis direction of the coordinate system C1. In FIG. 12, a y coordinate $y_\alpha$ corresponds to the positions of the teaching points TP15 and T16 in the y-axis direction in the coordinate system C1 (FIG. 9), a y coordinate $y_\beta$ corresponds to the positions of the teaching points TP13 and T14 in the y-axis direction in the coordinate system C1, and a y coordinate $y_\gamma$ corresponds to the positions of the teaching points TP11 and TP12 in the y-axis direction in the coordinate system C1.

Through step S2, as illustrated in FIG. 12, the temperature T of the mating surface area SE' is controlled to be within a temperature range (T1≤T<T2) that is equal to or higher than the boiling point T1 of the cover material 102 and lower than the melting point T2 of the base material 100. In the present embodiment, the irradiation point P1 passes through the path between the teaching points TP13 and T14 in the irradiation point movement path MP twice, and passes through the other paths only once, while reciprocating once in the forward path (FIG. 7) and the return path (FIG. 8) of the irradiation point movement path MP.

In other words, with the irradiation point movement path MP, the irradiation point P1 more frequently passes through the center portion of the heating area HA in the y-axis direction of the coordinate system C1 in step S2. Thus, the temperature of the center portion of the heating area HA is the highest. As a result, the temperature of the center portion (portion of $y=y_\beta$) is also the highest in the mating surface area SE' as illustrated in FIG. 12.

When the mating surface area SE' is heated to the temperature T that is equal to or higher than the boiling point T1 and is lower than the melting point T2, the second layer 102*b* of the cover material 102 and the first layer 112*a* of the cover material 112 in the mating surface area SE' vaporize. The inflation pressure of the gas generated by the vaporization of the cover material 102 and the cover material 112 is extremely high.

Thus, the inflation pressure of the cover material 102 and the cover material 112, produced in the mating surface area SE' pushes the upper surface 114 of the base material 110 toward the lower side, and pushes the lower surface 106 of the base material 100 toward the upper side, resulting in slight elastic deformation of the base material 100 and the base material 110 at high temperature. This elastic deformation of the base material 100 and the base material 110 is reversible, meaning that the base material 100 and the base material 110 return to their original shapes upon being cooled.

Figure 13:
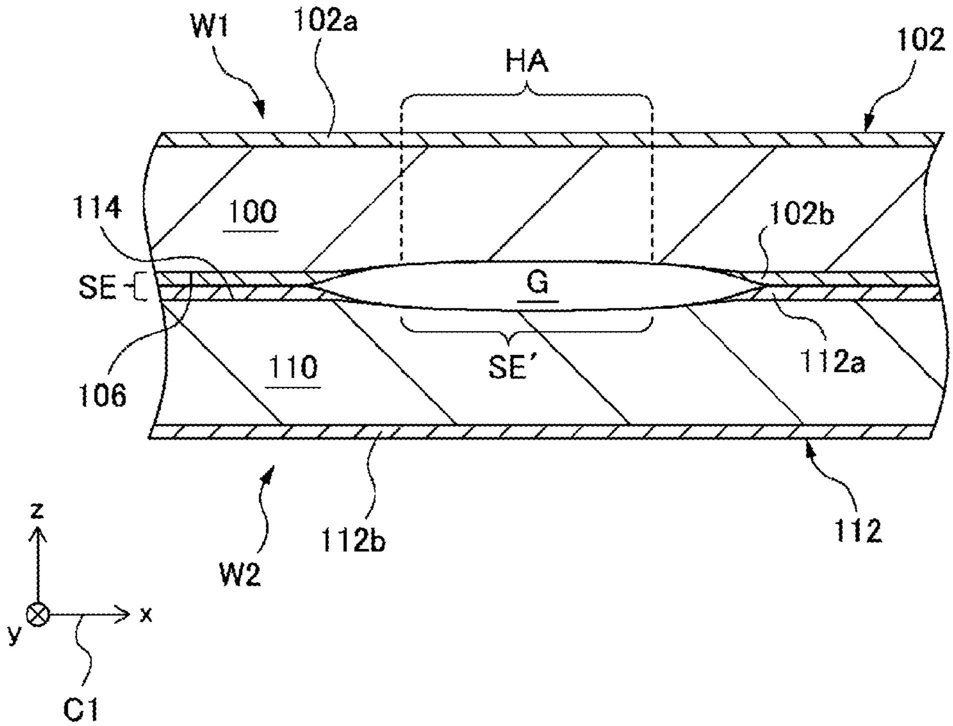
FIG. 13 schematically illustrates a state in which a gap is formed between the pair of workpieces as a result of step S2 in FIG. 10.

A gap G is formed between the pair of workpieces W1 and W2 as illustrated in FIG. 13, as a result of such vaporization of the cover material 102 and the cover material 112, elastic deformation of the base material 100 and the base material 110 caused by the vaporization, thermal expansion of the base material 100 and the base material 110 due to heating, and the like. Note that in FIG. 13, the gap G is illustrated in an emphasized manner for the sake of easier understanding. The actual size of the gap G is in the order of microns.

The vapor of the cover material 102 and the cover material 112 produced in the mating surface area SE' is radially blown toward the outside of the mating surface area SE', through the gap G. As a result, the second layer 102*b* of the cover material 102 and the first layer 112*a* of the cover material 112 in the mating surface area SE' are discharged to the outside of the mating surface area SE'.

With the mating surface area SE' thus heated to the temperature T that is equal to or higher than the boiling point T1 and lower than the melting point T2 in this step S2, the cover material 102 and the cover material 112 can be discharged from the mating surface area SE' while maintaining the base material 100 and the base material 110 in the solid state. In other words, the work condition CD (the speed V1, the laser power LP1, the time period tip, the focal position FP1, and the operation mode OM1) used in step S2 is set so that the temperature T of the mating surface area SE' can be controlled to be within the temperature range that is equal to or higher than the boiling point T1 and lower than the melting point T2.

The present inventors have performed an experiment of executing step S2 on the workpieces W1 and W2, which are galvanized steel sheets each having a thickness of 0.7 [mm], under the work condition CD described below.

| [Work condition CD] | |
|---|---|
| Heating area HA | length $x_1$ = 50 [mm] × width $y_1$ = 2 [mm] |
| Speed V1 | 200 [m/min] |
| Laser power LP1 | 5 [KW] |
| Time period $t_{HP}$ | 400 [msec] |
| Focal position FP1 | Position above the upper surface of workpiece W1 by 10 [mm] |
| Operation mode OM1 | Pulsed oscillation mode |

As a result of this experiment, it was confirmed that the cover material 102 and the cover material 112 were discharged from a rectangular region of the length x≈55 [mm]× the width y≈3 [mm] encompassing the entire region of the mating surface area SE' therein. Thus, this experiment result indicates that with the work condition CD appropriately set, the cover material 102 and the cover material 112 can be not only discharged from the mating surface area SE' but can also be discharged from a region in the periphery of the mating surface area SE'.

When the time period tip set as the work condition CD elapses from a time point at which the swinging of the irradiation point P1 in step S2 has started, the processor 50 transmits a command to the laser oscillator 12 to stop the emission of the laser beam LB1, thereby terminating the heating process HP in step S2. For example, the processor 50 may stop the emission of the laser beam LB1 by stopping the laser beam generation operation by the laser oscillator 12. Alternatively, the laser oscillator 12 may further include a shutter that opens and closes the optical path of the emitted laser beam LB1, and the processor 50 may stop the emission of the laser beam LB1 by closing the shutter.

Referring back to FIG. 10, the processor 50 determines whether the base material 100 and the base material 110 have been cooled down to a temperature not higher than a predetermined threshold value T3 in step S3. This threshold value T3 may be set to the melting point of the cover material 102 and the cover material 112, for example, or may be set to ambient temperature of the atmosphere.

For example, the processor 50 may measure an elapsed time period $t_1$ from a time point at which the heating process HP in step S2 has ended, and determine that the base materials 100 and 110 are cooled down to a temperature not higher than the threshold value T3 (i.e., YES) when the elapsed time period $t_1$ has reached a predetermined time period $t_{th}$.

This time period $t_{th}$ is determined in advance by the operator (e.g., $t_{th}$=20 [msec]) as a time period sufficient for the base material 100 and the base material 110 heated in step S2 to be cooled down to a temperature not higher than the threshold value T3, and is stored in the memory 52. The processor 50 proceeds to step S4 upon determining YES, and loops step S3 upon determining NO.

In step S4, the processor 50 executes the full welding process WP. Specifically, the processor first switches the operation mode OM of the laser oscillator 12 to the second operation mode OM2, and transmits a command for generating the laser beam LB2 of the second type having the laser power LP2, to the laser oscillator 12.

In response to the command, the laser oscillator 12 generates the laser beam LB2 having the laser power LP2 through continuous oscillation, and emits the laser beam LB2 to the laser irradiation device 16 through the light-guiding member 14. In the present embodiment, the laser power LP2 is set to a value smaller than the laser power LP1 in step S2 (LP2<LP1).

In addition, the processor 50 operates the lens driving device 30 of the laser irradiation device 16 to adjust the position of the optical lens 28, to control the focal point of the laser beam LB2 emitted from the laser irradiation device 16 to be at a focal position FP2. In the present embodiment, the focal position FP2 is set to a position (e.g., the position of the upper surface of the first layer 102*a*) closer to the upper surface of the workpiece W1 (i.e., the upper surface of the first layer 102*a* of the cover material 102) than the focal position FP1 described above is.

Thus, the laser beam LB2 having the laser power LP2 is emitted onto the workpiece W1. An irradiation point P2 of this laser beam LB2 has an area E2 (<E1) corresponding to the focal position FP2. Note that at this time point, the irradiation point P2 may be disposed at the teaching point TP1 of the welding location WL.

Then, the processor 50 operates the irradiation point movement mechanism 20 to move the irradiation point P2 of the laser beam LB2 with which the welding location WL is irradiated. Specifically, the processor 50 operates the mirror driving devices 38 and 40 to respectively change the orientation of the mirrors 34 and 36, to make the irradiation point P2 advance toward the right along the welding line LN from the teaching point TP1 to the teaching point TP2 at speed V2. The speed V2 may be set, for example, to be 3 [m/min] (i.e., V2<<V1).

The processor 50 may make the irradiation point P2 advance toward the right side along the welding line LN while swinging, in this step S4. Specifically, the processor 50 changes the orientation of the mirrors 34 and 36, to make the irradiation point P2 advance toward the right side while swinging in the y-axis direction of the coordinate system C1. This configuration can suppress production of sputtering as a result of melting the base material 100 and the base material 110 using the laser beam LB2.

When the irradiation point P2 reaches the teaching point TP2, the processor 50 transmits a command to the laser oscillator 12 to stop the laser beam LB2 emission. Thus, the full welding process WP in step S4 ends. With the full welding process WP in step S4, the base material 100 and the base material 110 are molten by the laser beam LB2 along the welding line LN, and are welded to each other in the welding location WL.

In step S5, the processor 50 determines whether the welding has been completed for all the welding locations WL. For example, the processor 50 can determine whether the welding has been completed for all the welding locations WL by analyzing the welding program PG. The processor 50 terminates the flow illustrated in FIG. 10 upon determining YES. On the other hand, upon determining NO, the processor 50 returns the step S1 and executes steps Step S1 to S5 for the next welding location WL.

As described above, in the present embodiment, in step S2, the processor 50 makes the irradiation point P1 of the laser beam LB1 swing within the heating area HA to heat the mating surface area SE' at the temperature T that is equal to or higher than the boiling point T1 of the cover materials 102 and 112 and lower than the melting point T2 of the base materials 100 and 110. Thus, the cover material 102 and the cover material 112 are discharged to the outside of the mating surface area SE' through the gap G formed between the workpieces W1 and W2.

Then, in step S4, the processor 50 irradiates the welding location WL with the laser beam LB2. As a result, the base material 100 and the base material 110 are molten and welded to each other in the welding location WL. With the present embodiment, through step S2, the second layer 102*b* of the cover material 102 and the first layer 112*a* of the cover material 112 can be removed from the region in which the base material 100 and the base material 110 are molten in step S4. Thus, the vapor of the cover material 102 and the cover material 112 in a form of bubbles can be prevented from mixing into the base material 100 and the base material 110, as a result of melting the base material 100 and the base material 110 in the welding location WL in step S4.

In the present embodiment, the gap G is formed by vaporizing the cover material 102 and the cover material 112 in the mating surface area SE', and the vapor of the cover material 102 and the cover material 112 is discharged to the outside of the mating surface area SE' through the gap G. Thus, a through hole, through which the vapor of the second layer 102*b* and the first layer 112*a* produced in step S4 is discharged to the outside, does not need to be formed in the base material 100 or 110 as in known configurations. Thus, the process of the welding flow can be simplified.

In the present embodiment, the orientations of the mirrors 34 and 36 are changed to make the irradiation point P1 swing in the heating area HA. With this configuration, the irradiation point P1 can swing at a high speed (speed V1) relative to the workpiece W1 (i.e., the speed V1 can be set to a high value). With this configuration, the entirety of the mating surface area SE' can be heated relatively uniformly in step S2.

In the present embodiment, the speed V2 as the work condition CD in step S4 is set to be much lower than the speed V1 as the work condition CD in step S2 (V2<<V1). With this configuration, the entirety of the mating surface area SE' can be heated relatively uniformly in step S2, and the base material 100 and the base material 110 can be reliably molten in step S4.

In the present embodiment, the area E1 of the irradiation point P1 in step S2 is larger than the area E2 of the irradiation point P2 in step S4 (E1>E2). With this configuration, the area heated by the laser beam LB1 in step S2 is large. Thus, the cover materials 102 and 112 can be more effectively discharged with high inflation pressure of the cover materials 102 and 112 produced in the mating surface area SE'. In addition, in step S4, the laser power per unit area at the irradiation point P2 can be increased, whereby the base material 100 and the base material 110 can be reliably molten.

In the present embodiment, the laser power LP1 as the work condition CD in step S2 is greater than the laser power LP2 as the work condition CD in step S4 (LP1>LP2). With this configuration, the mating surface area SE' can be swiftly heated to the temperature T that is equal to or higher than the boiling point T1 of the cover materials 102 and 112 and lower than the melting point T2 of the base materials 100 and 110 in step S2.

In the present embodiment, the heating area HA is irradiated with the laser beam LB1 (pulsed oscillation laser beam) of the first type in step S2, and the welding location WL is irradiated with the laser beam LB2 (continuous wave laser beam) of the second type in step S4. With this configuration, the mating surface area SE' can be efficiently heated while preventing excessive rise in temperature of the upper surface of the workpiece W1 in step S2, and the base material 100 and the base material 110 can be efficiently molten in step S4.

In the present embodiment, the irradiation point P1 swings in the heating area HA, to make temperature T' in the center portion of the heating area HA be highest in step S2. With the temperature gradient thus formed in the temperature distribution in the heating area HA, a temperature gradient as illustrated in FIG. 12 is also formed in the temperature distribution of the mating surface area SE'. Thus, the vapor of the cover material 102 and the cover material 112 can be more effectively blown radially to the outside of the mating surface area SE' in step S2.

In order to form the temperature gradient as illustrated in FIG. 12, in step S2, the processor 50 may control the laser power LP1 to be laser power $LP1_{\_1}$ while making the irradiation point P1 pass through the path between the teaching points TP13 and T14 in the irradiation point movement path MP, and control the laser power LP1 to be laser power $LP1_{\_2}$ ($<LP1_{\_1}$) while making the irradiation point P1 pass through other paths. With the laser power LP1 thus increased while the irradiation point P1 passes through the path between the teaching points TP13 and T14, the temperature gradient with the temperature being high in the center portion of the heating area HA (i.e., the mating surface area SE') can be effectively formed.

In the present embodiment, the base material 100 of the workpiece W1 is cooled to a temperature not higher than the threshold value T3 (i.e., when it is determined YES in step S3) after step S2, and then step S4 is executed. With the base material 100 and the base material 110 thus cooled after being heated, a fine material structure of the base material 100 and the base material 110 is obtained, whereby the base material 100 and the base material 110 can have higher strength. Alternatively, the processor 50 may omit step S3 described above and execute step S4 immediately after step S2.

In the above-described embodiment, the memory 52 may store in advance a data table DT1 storing in association with each other a material MT (or thermal conductivity) of the workpiece W1 and the workpiece W2, a thickness f of the workpieces W1 and W2, and the parameters of the work condition CD (the welding location WL, the heating area HA, the speeds V1 and V2, the laser powers LP1 and LP2, the time period $t_{HP}$, the focal position FP, and the operation mode OM).

As an example, the data table DT1 may be generated to store in association with each other a material $MT_A$ (or thermal conductivity) of the base material 100 and the base material 110, a material $MT_B$ (or thermal conductivity) of the cover material 102 and the cover material 112, the thicknesses f of the workpiece W1 and the workpiece W2 (or the thickness of the base material and the thickness of the cover material), and the parameters of the work condition CD used in step S2 (heating process HP) (e.g., the length of the welding line LN, the length $x_1$ and the width $y_1$ of the heating area HA, the speed V1, the laser power LP1, the time period $t_{HP}$, the focal position FP1, and the operation mode OM1).

Then, the processor 50 may display the data table DT1 on the display device 60. In this case, the operator can search the data table DT1 for the optimum work condition CD used in step S2 from the material $MT_A$ of the base material 100 and the base material 110 of the workpieces W1 and W2 that are the work targets, the material $MT_B$ of the cover material 102 and the cover material 112, and the thickness f of the workpieces W1 and W2, while referring to the data table DT1.

Alternatively, the processor 50 may generate an input screen on which the material $MT_A$, the material $MT_B$, and the thickness f can be input and display the input screen on the display device 60. Then, while visually recognizing the input screen displayed on the display device 60, the operator may operate the input device 58 to input the information about the material $MT_A$, the material $MT_B$, and the thickness f to the input screen.

Then, the processor 50 may search the data table DT1 for the work condition CD corresponding to the materials $MT_A$ and $MT_B$ and the thickness f input, and automatically set the work condition CD as the work condition CD used in step S2. With this configuration, the operation of setting the work condition CD can be automated, whereby the preparation process PP can be more easily executed.

The data table DT1 may be generated to store in association with each other the materials $MT_A$ and $MT_B$, the thickness f, and the parameters (e.g., the length of the welding line LN, the length $x_1$ and the width $y_1$ of the heating area HA, the speed V2, the laser power LP2, the focal position FP2, and the operation mode OM2) of the work condition CD used in step S4 (full welding process WP). The data table DT1 can be generated by collecting data through experimental techniques or simulations.

Figure 14:
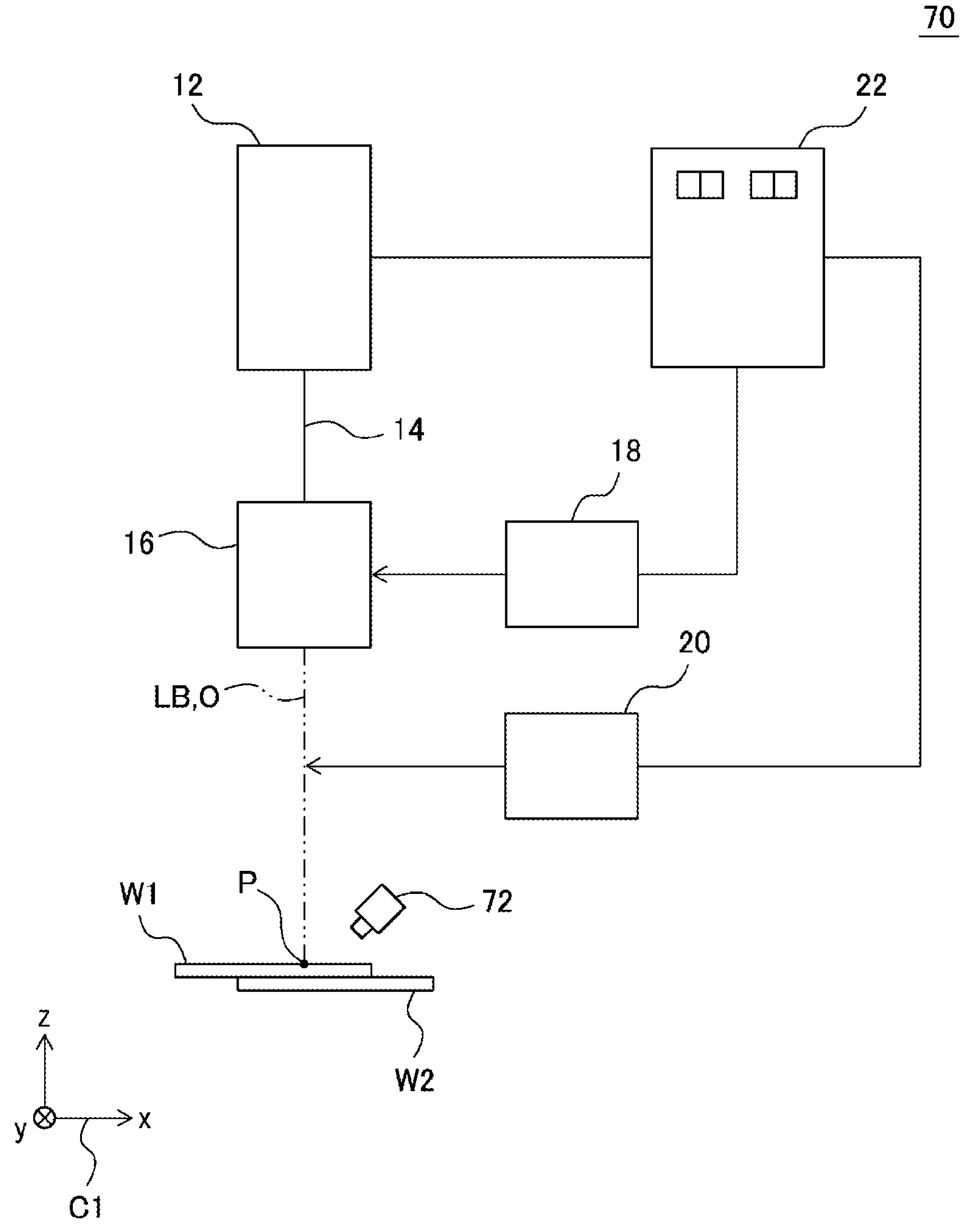
FIG. 14 is a schematic view of a laser welding system according to another embodiment.
Figure 15:
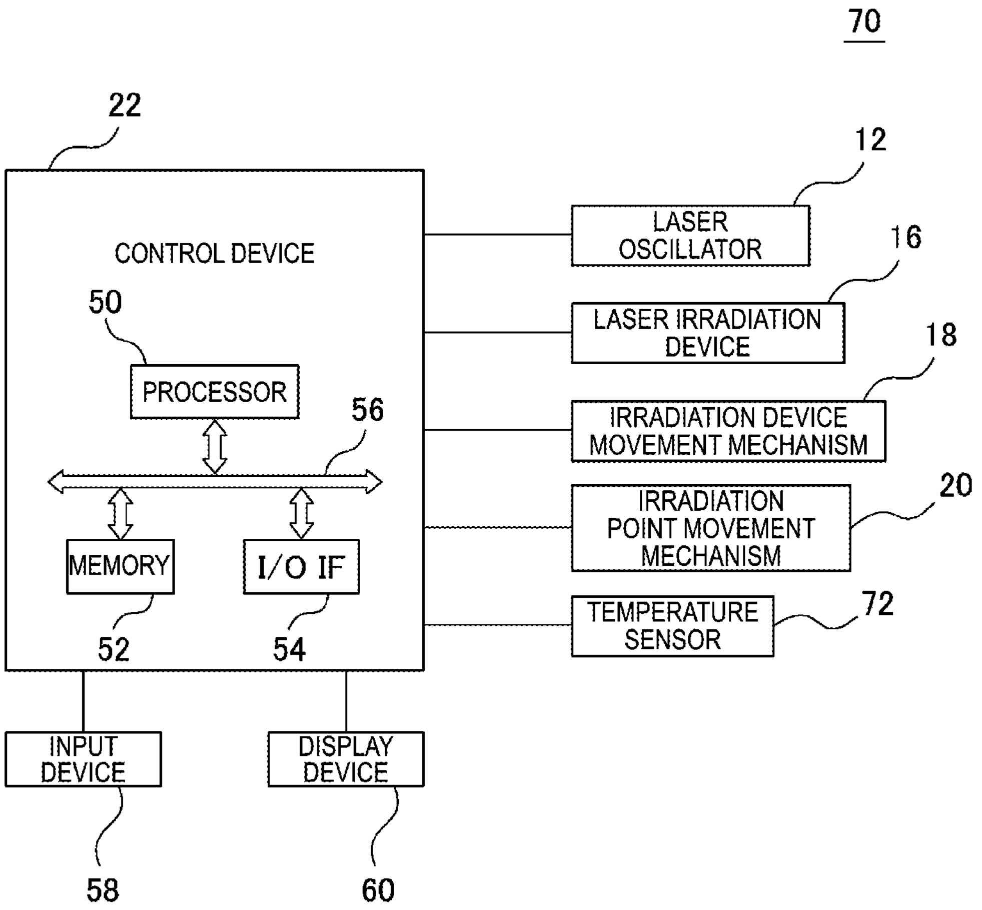
FIG. 15 is a block diagram of the laser welding system illustrated in FIG. 14.

Next, a laser welding system 70 according to another embodiment is described with reference to FIG. 14 and FIG. 15. The laser welding system 70 is different from the laser welding system 10 described above, in that a temperature sensor 72 is further provided. The temperature sensor 72 includes, for example, a thermocouple, a platinum temperature measurement resistor, and an infrared detection type temperature measuring device (such as a thermographic camera), and measures the temperature T' of the heating area HA on the workpiece W1 in a contact or contactless manner.

Figure 16:
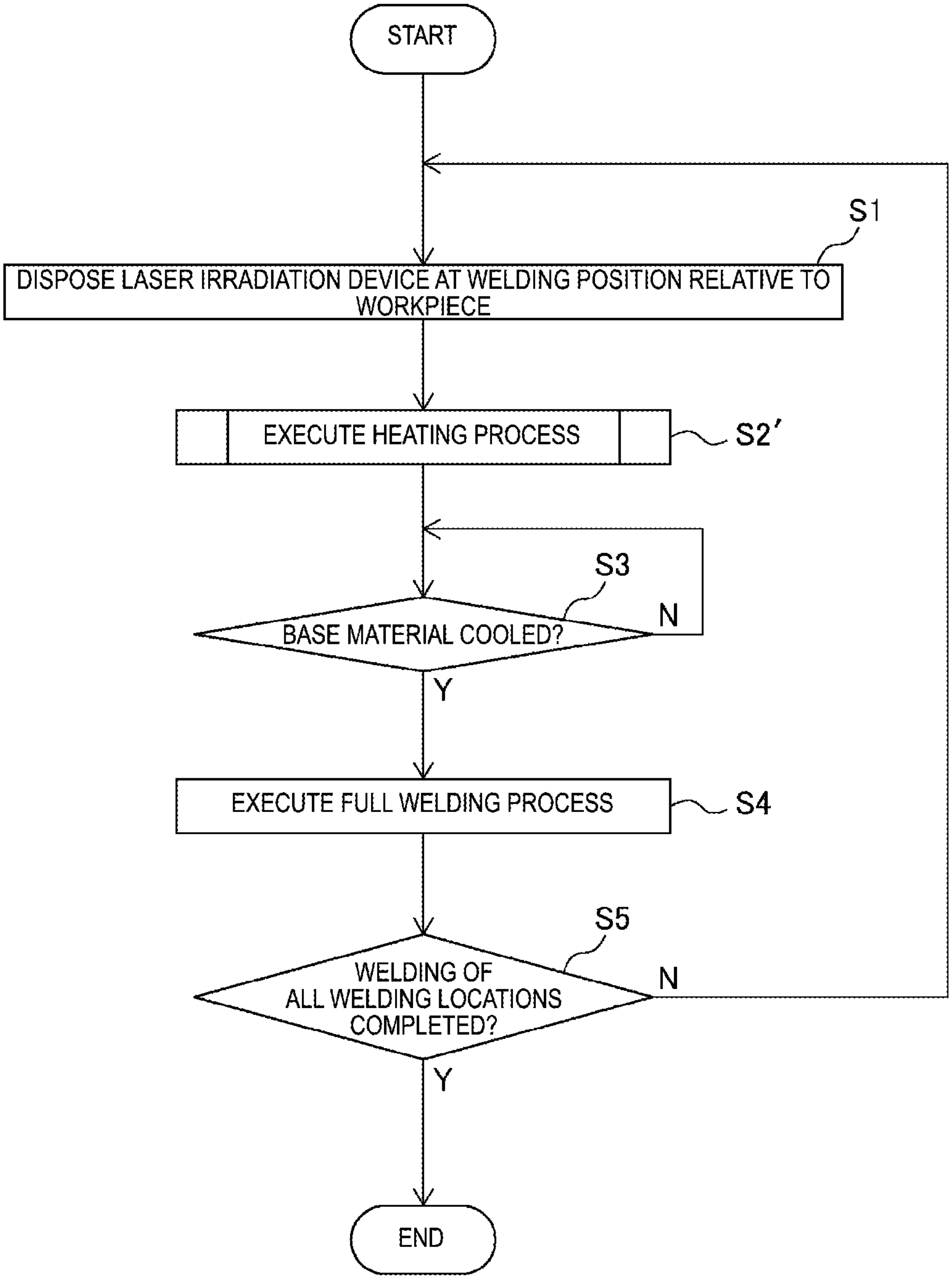
FIG. 16 is a flowchart illustrating an example of a welding flow performed by the laser welding system illustrated in FIG. 14.
Figure 17:
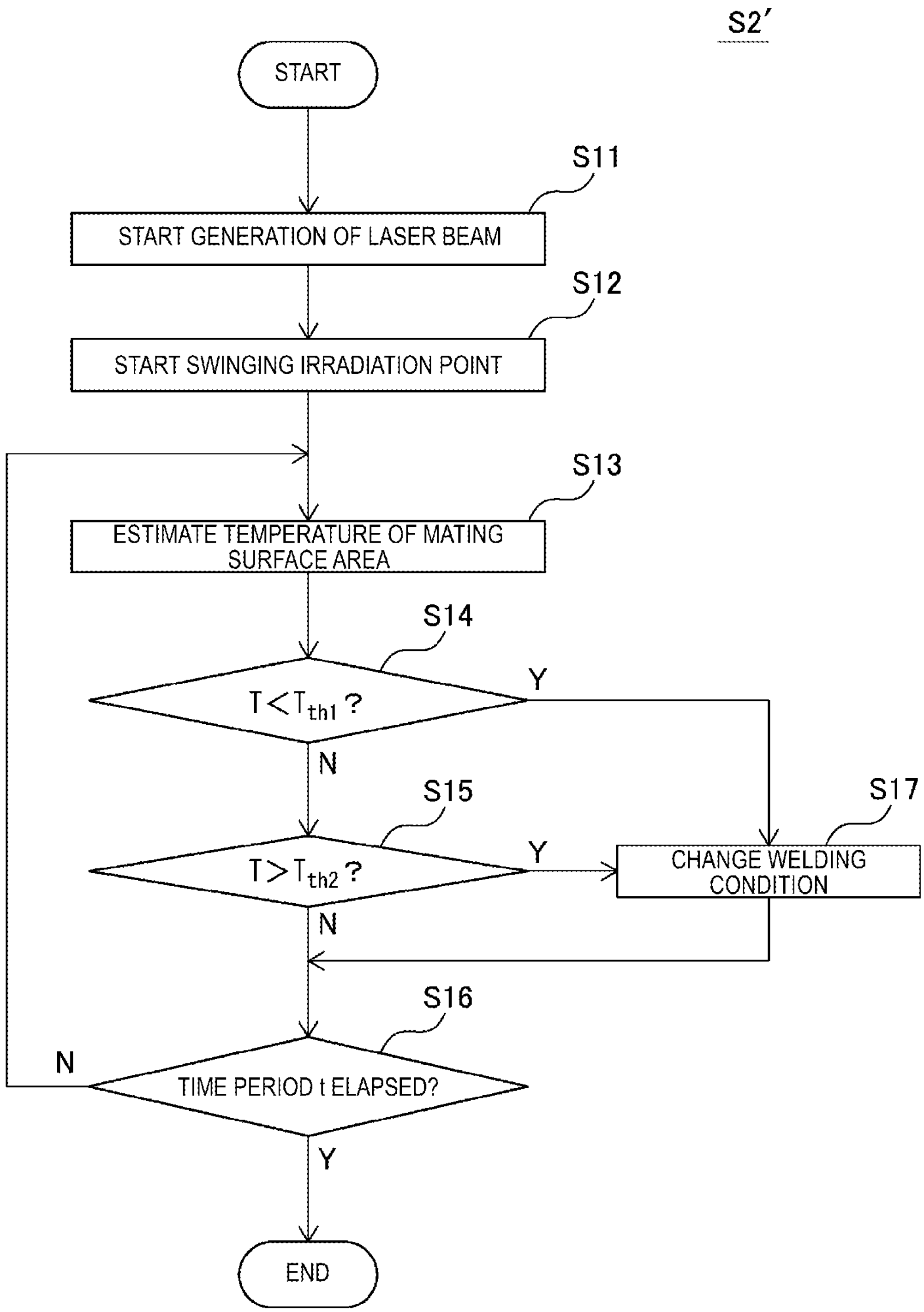
FIG. 17 illustrates an example of a flow of step ST in FIG. 16.

Next, a welding flow executed by a laser welding system 70 will be described with reference to FIG. 16. The welding flow in the present embodiment is different from the flow illustrated in FIG. in step ST (heating process HP). Hereinafter, step ST is described with reference to FIG. 17.

After step S2' is started, the processor 50 starts generating the laser beam LB1 in step S11. Specifically, as in step S2 described above, the processor 50 switches the operation mode OM of the laser oscillator 12 to the first operation mode OM1, and makes the laser oscillator 12 generate the laser beam LB1 (pulsed oscillation laser beam) of the first type having the laser power LP1. In addition, the processor 50 operates the lens driving device 30 to adjust the position of the optical lens 28, and controls the focal point of the laser beam LB1 to be at the focal position FP1.

In step S12, the processor 50 starts the operation of making the irradiation point P1 of the laser beam LB1 swing within the heating area HA. Specifically, as in step S2 described above, the processor 50 operates the irradiation point movement mechanism 20, to start the operation of making the irradiation point P1 of the laser beam LB1 swing along the irradiation point movement path MP at the speed V1 in the heating area HA.

In step S13, the processor 50 estimates the temperature T of the mating surface area SE'. Specifically, the processor 50 acquires the temperature T' of the heating area HA measured by the temperature sensor 72 at this time point, and estimates the temperature T of the mating surface area SE' based on the temperature T'. For example, the memory 52 stores in advance a data table DT2 storing in association with each other the temperature T' of the heating area HA and the temperature T of the mating surface area SE'.

This data table DT2 can be generated through experimental techniques, simulations of thermodynamics, or the like. The processor 50 searches the data table DT2 for the temperature T corresponding to the temperature T' acquired. Thus, the processor 50 can estimate the temperature T of the mating surface area SE' at this point, from the temperature T' of the heating area HA measured by the temperature sensor 72. As another example, the temperature T of the mating surface area SE' may be estimated by applying the temperature T' of the heating area HA measured by the temperature sensor 72 to a known thermodynamic equation.

Note that the temperature sensor 72 may be disposed to measure the temperature T' of the center portion of the heating area HA. In this case, the temperature sensor 72 measures the maximum temperature T' of the heating area HA, and the processor 50 estimates the temperature T (maximum temperature) of the center portion of the mating surface area SE' from the maximum temperature T' in this step S13. Alternatively, the temperature sensor 72 may be disposed to measure the temperature T' of any position in the heating area HA (e.g., a position of any of the teaching points TP11 to TP16).

In step S14, the processor 50 determines whether the temperature T estimated in the most-recent step S13 is lower than a predetermined threshold value $T_{th1}$ ($T<T_{th1}$). The threshold value $T_{th1}$ is determined by the operator in advance and stored in the memory 52. For example, the threshold value $T_{th1}$ may be set to the boiling point T1 (or lower temperature) of the cover materials 102 and 112, or may be set to a temperature higher than the boiling point T1 and lower than the melting point T2 of the base materials 100 and 110 ($T1<T_{th1}<T2$). The processor 50 determines YES and proceeds to step S17 when $T<T_{th1}$ holds, and determines NO and proceeds to step S15 when $T\geq T_{th1}$ holds.

In step S15, the processor 50 determines whether the temperature T estimated in the most-recent step S13 is higher than a predetermined threshold value $T_{th2}$ ($T>T_{th2}$). The threshold value $T_{th2}$ is determined in advance by the operator as a value higher than the threshold value $T_{th1}$ described above and stored in the memory 52.

For example, the threshold value $T_{th2}$ may be set to the melting point T2 (or a temperature not lower than the melting point T2) of the base materials 100 and 110, or may be set to a temperature that is higher than the boiling point T1 of the cover materials 102 and 112 and lower than the melting point T2 (e.g., $T1<T_{th1}<T_{th2}<T2$). The processor 50 determines YES and proceeds to step S17 when $T>T_{th2}$ holds, and determines NO and proceeds to step S16 when $T\leq T_{th2}$ holds.

In step S16, the processor 50 determines whether the time period $t_{HP}$ set in the work condition CD has elapsed after the start time of step S12. Specifically, the processor 50 measures a time period $t_2$ elapsed after the start time of step S12, and determines whether the elapsed time period $t_2$ has reached the time period $t_{HP}$. The processor 50 determines YES, ends step S2', and proceeds to step S3 in FIG. 16 when the elapsed time period $t_2$ has reached the time period $t_{HP}$, and determines NO and returns to step S13 when the elapsed time period $t_2$ has not reached the time period $t_{HP}$.

Upon determining YES in step S14 or step S15, the processor 50 changes the work condition CD in step S17. Specifically, in step S17 after determining YES in step S14, the processor 50 changes the work condition CD to, for example, reduce the speed V1, increase the laser power LP1, increase the time period $t_{HP}$, or move the focal position FP1 toward the upper surface of the workpiece W1.

The reduction in the speed V1, the increase in the laser power LP1, the increase in the time period $t_{HP}$, and the movement of the focal position FP1 toward the upper surface of workpiece W1 all lead to an increase in the temperature of heating area HA (i.e., the mating surface area SE'). Therefore, by thus changing the work condition CD, the temperature T of the mating surface area SE' can be increased to be equal to or higher than the threshold value Tim.

On the other hand, in step S17 after determining YES in step S15, the processor 50 changes the work condition CD to, for example, increase the speed V1, reduce the laser power LP1, reduce the time period $t_{HP}$, or move the focal position FP1 away from the upper surface of the workpiece W1.

The increase in the speed V1, the reduction in the laser power LP1, the reduction in the time period $t_{HP}$, and the movement of the focal position FP1 away from the upper surface of the workpiece W1 all lead to a reduction in the temperature of the heating area HA (i.e., the mating surface area SE'). Therefore, by thus changing the work condition CD, the temperature T of the mating surface area SE' can be reduced to be equal to or lower than the threshold value $T_{th2}$. After executing step S17, the processor 50 continues step S2' under the work condition CD after the change, and proceeds to step S16.

As described above, in the present embodiment, the processor 50 estimates the temperature T of the mating surface area SE' from the temperature T' of the heating area HA measured by the temperature sensor 72, and changes the work condition CD based on the temperature T. With this configuration, the temperature T of the mating surface area SE' can be controlled in detail while step S2' is being executed. Thus, the cover material 102 and the cover material 112 in the mating surface area SE' can be discharged to the outside more effectively. The work condition CD (e.g., the time period $t_{HP}$ for executing the heating process HP) can be optimized.

The laser irradiation device 16 and the irradiation point movement mechanism 20 are not limited to the embodiment illustrated in FIG. 3. For example, one of the mirrors 34 and 36 can be omitted from the irradiation point movement mechanism 20 illustrated in FIG. 3. In this case, the irradiation point movement mechanism 20 may be configured using the other one of the mirrors 34 and 36 to make the irradiation point P on the workpiece W1 reciprocate relative to the workpiece W1 over the length $x_1$ in the x-axis direction of the coordinate system C1.

On the other hand, the irradiation point movement mechanism 20 may further include a work table to which the workpieces W1 and W2 are fixed, and a table driving device (e.g., a piezoelectric element, an ultrasonic vibrator, or an ultrasonic motor) that reciprocates the work table within the width $y_1$ in the y-axis direction of the coordinate system C1 (both of which are not illustrated).

In this case, the irradiation point movement mechanism 20 can heat the entire heating area HA, by making the workpieces W1 and W2 swing in the y-axis direction of the coordinate system C1 using the table driving device and making the irradiation point P swing in the x-axis direction of the coordinate system C1 relative to the workpiece W1 using the other one of the mirrors 34 and 36. The heating area HA at this time is a substantially rectangular region of the length $x_1$×the width $y_1$, and is defined by movement paths of the irradiation point P relative to the workpiece W1.

The laser irradiation device 16 is not limited to the laser scanner as illustrated in FIG. 3, and may be, for example, a laser processing head including a mirror that reflects the received laser beam and an optical lens that focuses the laser beam reflected by the mirror. In this case, the irradiation point movement mechanism 20 may include a rotary lens rotatably disposed inside the laser processing head.

The rotary lens is supported, on the optical path of the laser beam reflected by the mirror of the laser processing head, to be rotatable about the axis parallel to the optical path, and has a laser beam incident surface inclined relative to the optical path. The irradiation point movement mechanism 20 can displace the irradiation point P on the workpiece W1 by rotating this rotary lens.

In the embodiment described above, a case has been described where in the preparation process PP, the operator sets the heating area HA for the workpiece W1, and then sets the teaching points TP11 to TP16 and the irradiation point movement path MP (FIG. 5 to FIG. 9). Still, the process of setting the heating area HA can be omitted from the preparation process PP.

For example, the operator may set the teaching points TP11 to TP16 to surround the welding location WL after setting the welding location WL for the workpiece W1, and then set the irradiation point movement path MP based on the teaching points TP11 to TP16. In this case, the heating area HA is uniquely determined as illustrated in FIG. 9, for example, based on the teaching points TP11 to TP16 and the irradiation point movement path MP set.

In the preparation process PP, after the welding location WL has been set by the operator, the processor 50 may automatically set the heating area HA to encompass the welding location WL, based on the position data on the welding location WL. In this case, the operator may input information such as the length $x_1$, the width $y_1$, the distance $x_2$, and the distance $x_3$ illustrated in FIG. in advance through the input device 58, and the processor 50 may automatically set the heating area HA based on the input data from the operator.

Figure 5:
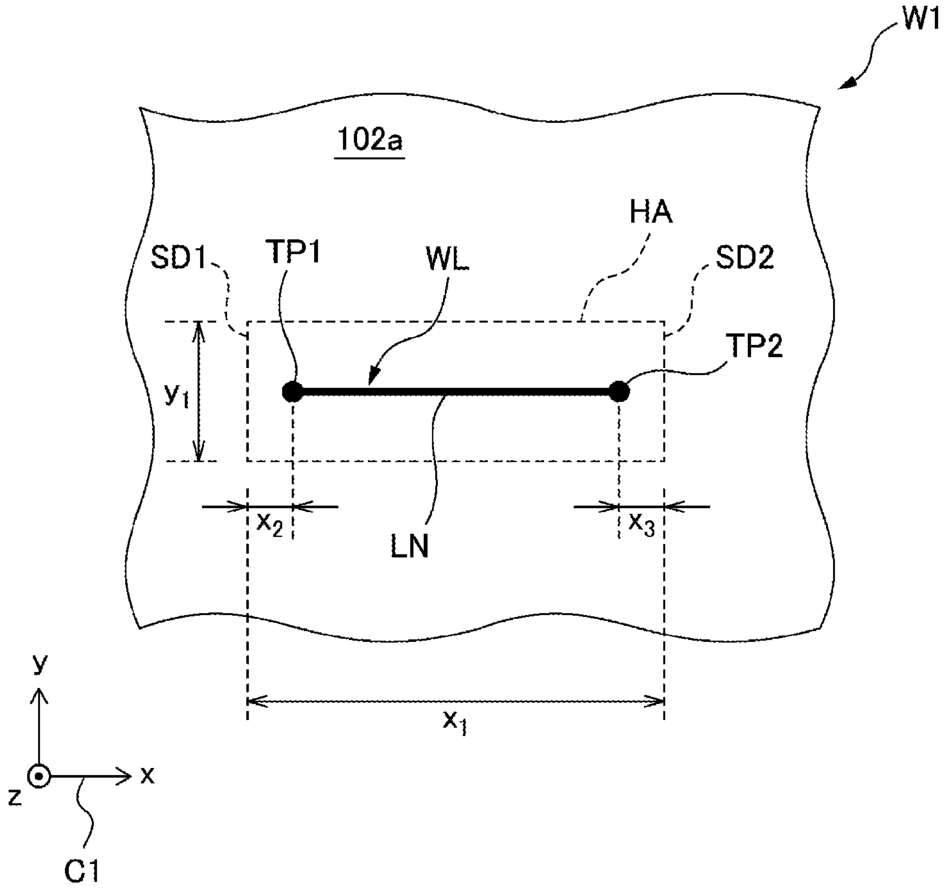
FIG. 5 illustrates an example of a welding location and a heating area.

At least one of the distance $x_2$ and the distance $x_3$ illustrated in FIG. 5 may be zero. In this case, the teaching point TP1 is disposed on the left side SD1 of the heating area HA, or the teaching point TP2 is disposed on the right side SD2 of the heating area HA. The teaching point TP1 may be disposed more on the left side than the left side SD1 of the heating area HA.

Alternatively, the teaching point TP2 may be disposed more on the right side than the right side SD2 of the heating area HA. In this case, most of the welding location WL is encompassed in the heating area HA, and both end portions of the welding location WL are disposed outside the heating area HA. As described above, as a result of the experiment performed by the present inventors, it has been found that through the heating process HP, the cover material 102 and the cover material 112 can be discharged not only from the mating surface area SE' but also from the region in the periphery of the mating surface area SE'. Thus, even when part of the welding location WL is disposed outside the heating area HA, the cover material 102 and the cover material 112 may be dischargeable from the region where the welding location WL exists.

Figure 18:
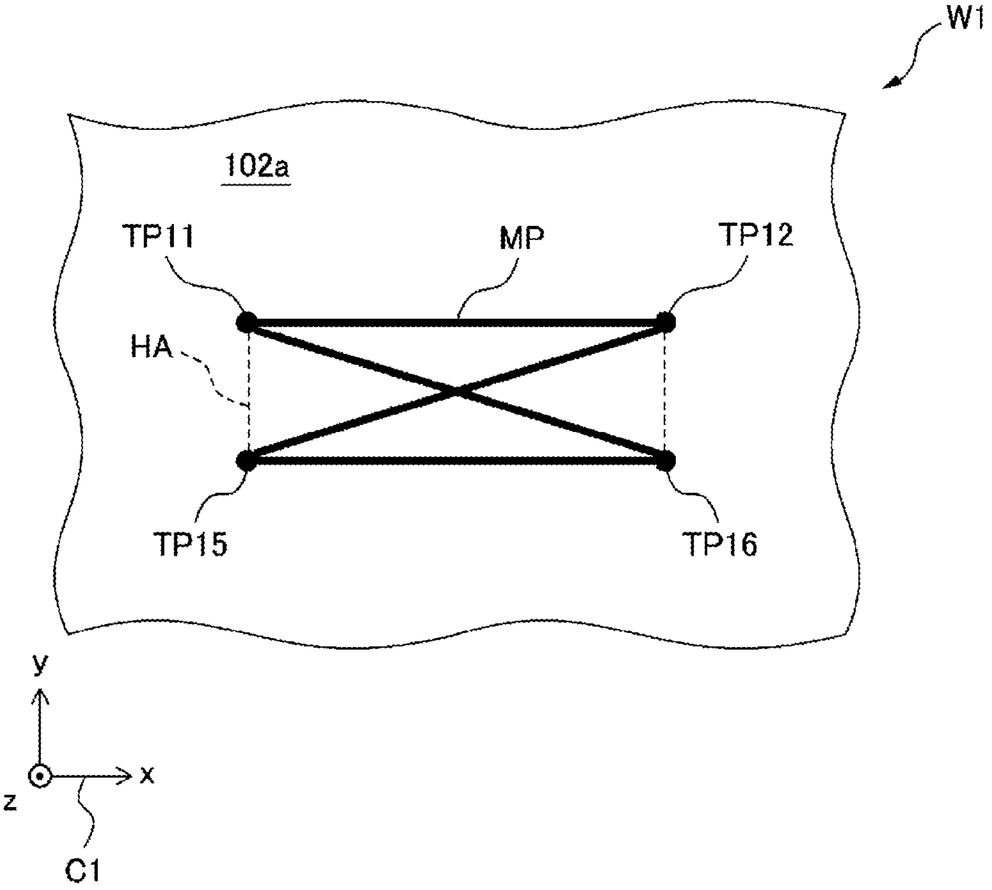
FIG. 18 illustrates another example of the irradiation point movement path set to the heating area.

The irradiation point movement path MP illustrated in FIG. 9 is merely an example, and various other irradiation point movement paths are conceivable. FIG. 18 illustrates another example of the irradiation point movement path MP. In the example illustrated in FIG. 18, four teaching points TP11, TP12, TP15 and TP16 are set to be at the vertices of the heating area HA, and the irradiation point movement path MP is set as, for example, a path that passes through the teaching points TP11, TP12, TP15, TP16, and TP11 in this order. The irradiation point movement path MP may be set as a path that makes the temperature T of the mating surface area SE' uniformly rise when the heating process HP is executed, without forming the temperature gradient as illustrated in FIG. 12.

Figure 19:
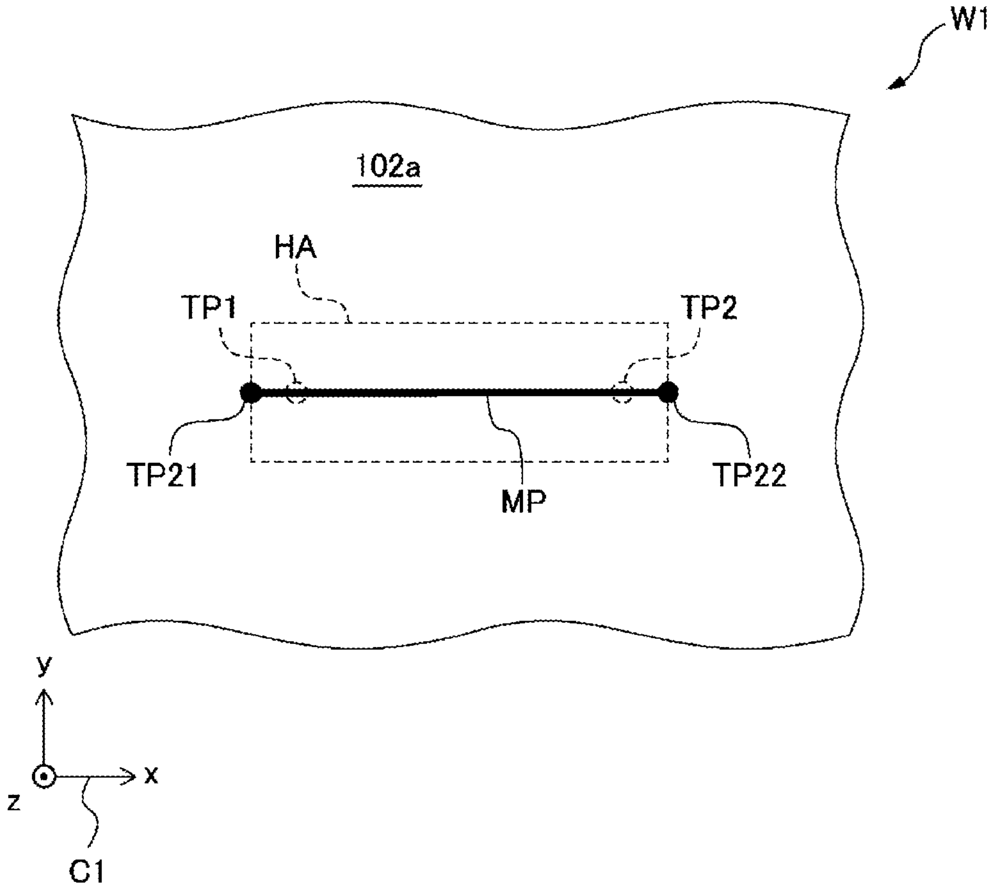
FIG. 19 illustrates further another example of the irradiation point movement path set to the heating area.

FIG. 19 illustrates still another example of the irradiation point movement path MP. In the example illustrated in FIG. 19, two teaching points TP21 and TP22 are set to the heating area HA, and the irradiation point movement path MP is set as a path that reciprocates between the teaching points TP21 and TP22. The teaching points TP21 and TP22 may be set at the same positions as the teaching points TP1 and TP2 in the y-axis direction of the coordinate system C1. Also with such an irradiation point movement path MP, the entirety of the heating area HA and the mating surface area SE' can be heated, by appropriately setting the work condition CD.

In step S2 described above, the laser power LP1 may be changed together with the speed V1 as the irradiation point P1 moves along the irradiation point movement path MP from one teaching point $TP_\alpha$ to the next teaching point $TP_\gamma$ subsequent to the teaching point $TP_\alpha$. Control to achieve this will be described below with reference to FIG. 20.

Figure 20:
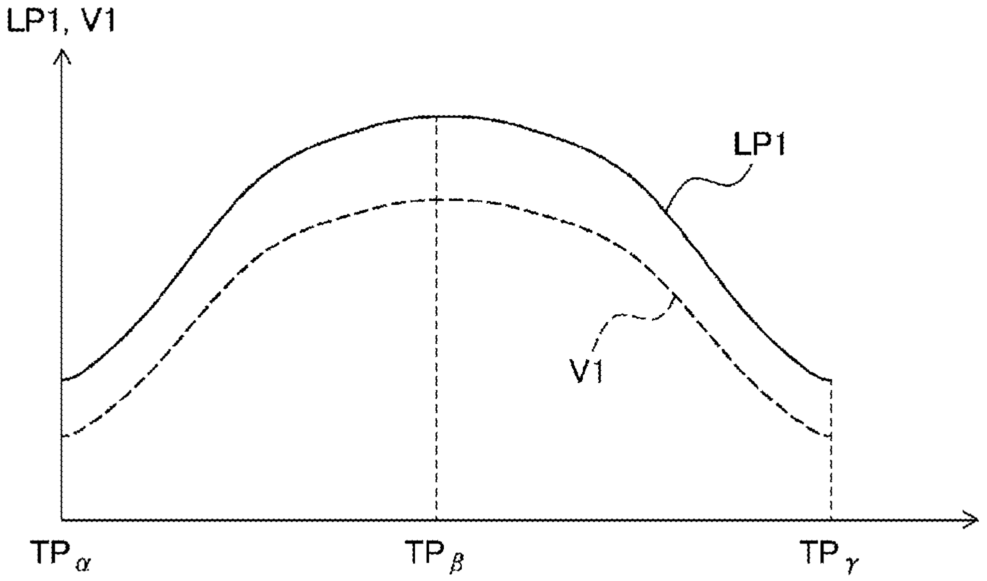
FIG. 20 illustrates an example of control of the speed of an irradiation point and laser power in a heating process.

In FIG. 20, the horizontal axis represents two consecutive teaching points $TP_\alpha$ and $TP_\gamma$ in the irradiation point movement path MP and a point (e.g., a midpoint) $TP_\beta$ between the teaching points $TP_\alpha$ and $TP_\gamma$, and the vertical axis represents the speed V1 and the laser power LP1. A solid line in the graph in FIG. 20 indicates the laser power LP1, while a dashed line indicates the speed V1.

In the example illustrated in FIG. 20, when the irradiation point P1 moves from the teaching point $TP_\alpha$ to the teaching point $TP_\gamma$ in step S2, the irradiation point P1 is gradually accelerated from the teaching point $TP_\alpha$ to the point $TP_\beta$ with the speed V1 increasing. The irradiation point P1 is gradually decelerated with the speed V1 decreasing until the irradiation point P1 reaches the teaching point $TP_\gamma$ after passing through the point TP13.

If the laser power LP1 is controlled to be constant in the above-described case where the speed V1 changes while the irradiation point P1 moves from the teaching point $TP_\alpha$ to the teaching point $TP_\gamma$, in the heating area HA, the temperature of the region in the vicinity of the teaching points $TP_\alpha$ and $TP_\gamma$ where the speed V1 decreases can be excessively higher than the temperature of the region in the vicinity of a point $TP_\beta$. In this case, the temperature T at the end edge (e.g., the sides SD1 and SD2) of the heating area HA can be excessively higher than that in the center portion.

Thus, as illustrated in FIG. 20, in step S2, the processor 50 increases the laser power LP1 together with the speed V1 as the irradiation point P1 moves from the teaching point $TP_\alpha$ to the point $TP_\beta$, and reduces the laser power LP1 together with the speed V1 as the irradiation point P1 moves from the point $TP_\beta$ to the teaching point $TP_\gamma$. With the laser power LP1 changed together with the speed V1 as described above, the entirety of the heating area HA (i.e., the mating surface area SE) can be relatively uniformly heated.

In the embodiment illustrated in FIG. 9, the irradiation point movement path MP from the teaching point $TP_\alpha$ to the teaching point $TP_\gamma$ illustrated in FIG. 20 may be, for example, the path from TP11 to TP12, the path from TP13 to TP14, and the path from TP15 and TP16. In this case, the processor 50 may control the value (maximum value, minimum value, or average value) of the laser power LP1 in the path from TP13 to TP14 to be $LP1_{-1}$, and control the value of the laser power LP1 during the passage of the other paths to be $LP1_{-2}$ ($<LP1_{-1}$).

On the other hand, the processor 50 may control the laser power LP1 to be constant, while the irradiation point P1 passes through the path from TP12 to TP13, the path from TP14 to TP15, the path from TP16 to TP13, and the path from TP14 to TP11. Thus, in this case, the processor 50 changes the laser power LP1 when the irradiation point movement path MP between the two teaching points $TP_\alpha$ and $TP_\gamma$ is relatively long, and controls the laser power LP1 to be constant when the irradiation point movement path MP between the teaching points $TP_\alpha$ and $TP_\gamma$ is relatively short.

In the embodiment illustrated in FIG. 18, the irradiation point movement path MP from the teaching point $TP_\alpha$ to the teaching point $TP_\gamma$ illustrated in FIG. 20 may be the path from TP11 to TP12, the path from TP12 to TP15, the path from TP15 to TP16, and the path from TP16 to TP11. In the embodiment illustrated in FIG. 19, the irradiation point movement path MP from the teaching point $TP_\alpha$ to the teaching point $TP_\gamma$ illustrated in FIG. 20 may be the path from TP11 to TP12 and the path from TP12 to TP11.

Note that in the work condition CD described above, a focus-point power density ρ1 of the laser beam LB1 with which the heating area HA is irradiated in step S2 may be determined instead of (or in addition to) the laser power LP1 and the focal position FP1. The focus-point power density ρ1 may be defined as, for example, the laser power LP1 per unit area of the irradiation point P1 on the workpiece W1 (i.e., $\rho1=LP1/E1$).

In the work condition CD described above, a focus-point power density ρ2 of the laser beam LB2 with which the welding location WL is irradiated in step S4 may be determined instead of (or in addition to) the laser power LP2 and the focal position FP2. The focus-point power density ρ2 may be defined as, for example, the laser power LP2 per unit area of the irradiation point P2 on the workpiece W1 (i.e., $\rho2=LP2/E2$). Here, as described above, an area E of the irradiation point P on the workpiece W1 depends on the focal position FP of the laser beam LB. Thus, a focus-point power density p is controllable by appropriately selecting the laser power LP of the laser beam LB and the focal position FP of the laser beam LB.

In the work condition CD, the focus-point power density ρ1 of the laser beam LB1 in step S2 may be set to a value smaller than the focus-point power density ρ2 of the laser beam LB2 in step S4 ($\rho1<\rho2$). For example, the processor 50 controls the laser power LP1 to be 5 [kW] in step S2, and controls the focal position FP1 to be at a position 10 [mm] above the upper surface of the workpiece W1. In this case, the diameter of the irradiation point P1 is about 0.9 [mm], and the area E1 is about 0.64 [$mm^2$]. Therefore, in this case, the focus-point power density ρ1 can be controlled to be $\rho1\approx8$ [$kW/mm^2$].

On the other hand, the processor 50 controls the laser power LP2 to be 2 [kW] in step S4, and controls the focal position FP2 to be at the position of the upper surface of the workpiece W1. In this case, the diameter of the irradiation point P2 is about 0.4 [mm], and thus the area E2 is about 0.13 [$mm^2$]. Therefore, in this case, the focus-point power density ρ2 can be controlled to be $\rho2\approx15.4$ [$kW/mm^2$]$>\rho1$.

Note that the memory 52 may store in advance a data table DT3 storing a focus-point power density p in association with the laser power LP and the focal position FP. Then, when executing step S2 or S4, the processor 50 may search the data table DT3 for the laser power LP and the focal position FP corresponding to the focus-point power density ρ set for the work condition CD, and irradiates the workpiece W1 with the laser beam LB with the laser power LP and the focal position FP thus found, to control the focus-point power density ρ.

In the work condition CD described above, the time period $t_{MP}$ required for the irradiation point P1 swung by the irradiation point movement mechanism 20 in the heating process HP to reciprocate once on the irradiation point movement path MP, may be determined instead of (or in addition to) the speed V1. The heating process HP (step S2 or S2') and the full welding process WP (S4) may be executed under the same operation mode OM (OM1 or OM2). In this case, the workpiece W1 is irradiated with the same type of laser beam LB (LB1 or LB2) in the heating process HP and the full welding process WP.

The focal position FP may be the same between the heating process HP and the full welding process WP. In this case, the area E1 of the irradiation point P1 in the heating process HP and the area E2 of the irradiation point P2 in the full welding process WP are substantially the same. The laser power LP may be the same (LP1=LP2) between the heating process HP and the full welding process WP.

The laser welding system 10 may include a plurality of the control devices 22 each individually controlling a corresponding one of the laser oscillator 12, the laser irradiation device 16, the irradiation device movement mechanism 18, and the irradiation point movement mechanism 20. The heating area HA (teaching point TPn and the irradiation point movement path MP) is not limited to the first layer 102*a* of the cover material 102, and may be set to the base material 100.

The heating area HA may be set to the workpiece W1 (the first layer 102*a* of the cover material 102) and the welding location WL may be set to the workpiece W2 (the second layer 112*b* of the cover material 112). In this case, the processor 50 may irradiate the workpiece W1 with the laser beam LB1 from the upper side in the heating process HP, and irradiate the workpiece W2 with the laser beam LB2 from the lower side in the full welding process WP.

In this case, the laser welding system 10, 70 may further include a second laser irradiation device 18B that can irradiate the workpiece W2 with the laser beam LB2 from the lower side and a second irradiation point movement mechanism 20B that moves the irradiation point P2 on the workpiece W2. When the heating area HA is set to the workpiece W1 and the welding location WL is set to the workpiece W2, while the heating area HA and the welding location WL are separated from each other in the z-axis direction of the coordinate system C1, the welding location WL can be regarded as being encompassed in the heating area HA as viewed in the z-axis direction illustrated in FIG. 5.

One of the workpieces W1 and W2 may not include the cover material 102 or 112. For example, when the workpiece W1 does not include the cover material 102, the workpiece W1 is formed by the base material 100, and the workpieces W1 and W2 are stacked such that the lower surface 106 of the base material 100 surface-contacts with the upper surface of the workpiece W2 (the upper surface of the first layer 112*a* of the cover material 112). In this case, the first layer 112*a* of the cover material 112 is interposed between the base material 100 and the base material 110.

The base material 100 and the base material 110 may be made of metals of types different from each other. The cover material 102 and the cover material 112 may be made of metals of types different from each other. In this case, in the heating process HP, the mating surface area SE' may be heated to a temperature that is equal to or higher than the boiling point of the cover material 102 and the cover material 112 and lower than the melting point of the base material 100 (and the base material 110). The cover material 102 and the cover material 112 may be made of a material (e.g., resin) other than metal.

Although the present disclosure has been described above through the embodiments, the above embodiments are not intended to limit the invention as set forth in the claims.

REFERENCE SIGNS LIST

10, 70 Laser welding system
12 Laser oscillator
14 Light-guiding member
16 Laser irradiation device
18 Irradiation device movement mechanism
20 Irradiation point movement mechanism
22 Control device
50 Processor
72 Temperature sensor

The invention claimed is:

1. A method of laser welding a first workpiece and a second workpiece stacked so as to surface-contact with each other, the first workpiece and the second workpiece each including a base material, at least one of the first workpiece and the second workpiece including a cover material interposed between the base materials of the first workpiece and the second workpiece, the method comprising:

generating a laser beam by a laser oscillator and irradiating the first workpiece with the laser beam;

swinging an irradiation point of the laser beam within a heating area, which is set on the first workpiece so as to encompass a welding location on which the laser welding is to be executed, by repeatedly reciprocating the irradiation point through a forward path and a return path defined in the heating area, and heating a mating surface area of the first workpiece and the second workpiece, which corresponds to the heating area, to a temperature being equal to or higher than a boiling point of the cover material and lower than a melting point of the base material of the first workpiece;

forming a gap between the first workpiece and the second workpiece by vaporizing the cover material in the mating surface area by the heating, and discharging the cover material to outside of the mating surface area through the gap; and melting and welding the base materials of the first workpiece and the second workpiece to each other in the welding location by irradiating the welding location with the laser beam, after discharging the cover material to the outside of the mating surface area.

2. The method of claim 1, comprising:

irradiating the first workpiece with the laser beam by reflecting the laser beam with a mirror disposed on an optical path of the laser beam generated by the laser oscillator; and swinging the irradiation point within the heating area by changing an orientation of the mirror.

3. The method of claim 2, wherein the mirror includes:

a first mirror disposed on the optical path, and configured to displace the irradiation point along a first axis in the heating area; and a second mirror disposed on an optical path of the laser beam reflected by the first mirror, and configured to displace the irradiation point along a second axis orthogonal to the first axis in the heating area.

4. The method of claim 1, comprising:

swinging the irradiation point in the heating area at a first speed when heating the mating surface area; and advancing an irradiation point of the laser beam irradiated onto the welding location along the welding location at a second speed lower than the first speed when melting the base materials of the first workpiece and the second workpiece.

5. The method of claim 1, wherein an area of the irradiation point of the laser beam irradiated onto the heating area when heating the mating surface area is larger than an area of an irradiation point of the laser beam irradiated onto the welding location when melting the base materials of the first workpiece and the second workpiece.

6. The method of claim 1, wherein laser power of the laser beam irradiated onto the heating area when heating the mating surface area is higher than laser power of the laser beam irradiated onto the welding location when melting the base materials of the first workpiece and the second workpiece.

7. The method of claim 1, wherein a focus-point power density of the laser beam irradiated onto the heating area when heating the mating surface area is lower than a focus-point power density of the laser beam irradiated onto the welding location when melting the base materials of the first workpiece and the second workpiece.

8. The method of claim 1, comprising changing laser power of the laser beam irradiated onto the heating area together with a speed at which the irradiation point is swung in the heating area, when heating the mating surface area.

9. The method of claim 1, comprising advancing an irradiation point of the laser beam irradiated onto the welding location along the welding location while swinging the irradiation point, when melting the base materials of the first workpiece and the second workpiece.

10. The method of claim 1, comprising:

irradiating the heating area with the laser beam of a first type when heating the mating surface area; and irradiating the welding location with the laser beam of a second type different from the first type when melting the base materials of the first workpiece and the second workpiece.

11. The method of claim 10, wherein the laser beam of the first type is a pulsed oscillation laser beam, while the laser beam of the second type is a continuous wave laser beam.

12. The method of claim 1, comprising swinging the irradiation point in the heating area so as to make temperature in a center portion of the heating area be highest, when heating the mating surface area.

13. The method of claim 1, comprising irradiating the welding location with the laser beam to melt the base materials of the first workpiece and the second workpiece, when the base material of the first workpiece is cooled to a temperature equal to or lower than a predetermined threshold value after discharging the cover material to the outside of the mating surface area.

14. The method of claim 13, wherein the threshold value is a melting point of the cover material.

* * * * *